United States Patent
Keller et al.

(10) Patent No.: US 10,805,355 B2
(45) Date of Patent: Oct. 13, 2020

(54) NETWORK INITIATED CS SERVICES DURING IMS CALL

(71) Applicant: Telefonaktiebolaget LM Ericsson (publ), Stockholm (SE)

(72) Inventors: Ralf Keller, Würselen (DE); Magnus Hallenstål, Täby (SE); Ivo Sedlacek, Hovorcovice (CZ)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 77 days.

(21) Appl. No.: 16/107,495

(22) Filed: Aug. 21, 2018

(65) Prior Publication Data

US 2018/0359286 A1  Dec. 13, 2018

Related U.S. Application Data

(62) Division of application No. 14/785,743, filed as application No. PCT/EP2013/062383 on Jun. 14, 2013, now Pat. No. 10,079,860.

(60) Provisional application No. 61/808,394, filed on Apr. 4, 2013.

(51) Int. Cl.
| | |
|---|---|
| *H04W 76/18* | (2018.01) |
| *H04L 29/06* | (2006.01) |
| *H04W 68/00* | (2009.01) |
| *H04W 88/06* | (2009.01) |

(52) U.S. Cl.
CPC ....... *H04L 65/1016* (2013.01); *H04W 68/005* (2013.01); *H04W 76/18* (2018.02); *H04W 68/00* (2013.01); *H04W 88/06* (2013.01)

(58) Field of Classification Search
None
See application file for complete search history.

(56) References Cited

U.S. PATENT DOCUMENTS

| | | | |
|---|---|---|---|
| 2010/0208624 A1* | 8/2010 | Vikberg | H04W 68/12 370/259 |
| 2010/0265884 A1 | 10/2010 | Vikberg et al. | |
| 2011/0194505 A1* | 8/2011 | Faccin | H04W 48/18 370/329 |

(Continued)

FOREIGN PATENT DOCUMENTS

| | | | | |
|---|---|---|---|---|
| CA | 2796828 A1 * | 10/2011 | | H04W 76/18 |
| EP | 2571299 A1 | 3/2013 | | |
| WO | WO-2009000315 A1 * | 12/2008 | | H04W 68/12 |

OTHER PUBLICATIONS

Ericsson et al., "Handling of terminating CS services during IMS Call", 3GPP Draft; S2-131126_2327_CS_Services_IMS_Call, 3rd Generation Partnership Project (3GPP), Mobile Competence Centre, 650, Route Des Lucioles; F-06921 Sophia-Antipolis Cedex, France, vol. SA WG2, No. San Diego CA, USA, Apr. 8, 2013-Apr. 12, 2013, Apr. 2, 2013, 4 pages, XP050708341.

(Continued)

*Primary Examiner* — Kodzovi Acolatse
(74) *Attorney, Agent, or Firm* — Rothwell, Figg, Ernst & Manbeck, P.C.

(57) ABSTRACT

An interruption of a call which is established or which is currently being established via an internet protocol domain of a mobile network may be avoided during a handling of a circuit switched signaling service to be terminated to a terminal and being different from a mobile terminating location request service.

14 Claims, 11 Drawing Sheets

(56) References Cited

U.S. PATENT DOCUMENTS

| | | | |
|---|---|---|---|
| 2011/0207481 A1* | 8/2011 | Yin | H04W 68/00 455/458 |
| 2012/0009952 A1* | 1/2012 | Zhang | H04W 68/00 455/458 |
| 2012/0120789 A1* | 5/2012 | Ramachandran | H04W 36/0022 370/220 |
| 2014/0064156 A1 | 3/2014 | Paladugu et al. | |
| 2014/0106742 A1 | 4/2014 | Landais | |
| 2015/0124779 A1* | 5/2015 | Liu | H04W 36/0022 370/331 |
| 2015/0148048 A1* | 5/2015 | Jamadagni | H04W 36/0022 455/445 |
| 2015/0257043 A1* | 9/2015 | Wallis | H04W 36/0022 455/436 |

OTHER PUBLICATIONS

"3rd Generation Partnership Project; Technical Specification Group Services and System Aspects; Circuit Switched (CS) Fallback in Evolved Packet System (EPS); Stage 2 (Release 11)", 3GPP Standard; 3GPP TS 23.272, 3rd Generation Partnership Project (3GPP), Mobile Competence Centre; 650, Route Des Lucioles; F-06921 Sophia-Antipolis Cedex; France, vol. SA WG2, No. V11.4.0, Mar. 5, 2013, pp. 1-91, XP050691819.

3rd Generation Partnership Project Technical Specification Group Services and System Aspects; Circuit Switched (CS) fallback in Evolved Packet System (EPS); Stage 2 (Release 11), 3GPP TS 23.272 V11.3.0 (Dec. 2012), 91 pages.

"LS on SS service ID used in the Paging message," 3GPP TSG-SA WG2 Meeting #97, May 27-31, 2013, Busan, South Korea, S2-132296, 1 page.

Huawei et al., "SS service ID used in the Paging message", SA WG2 Meeting #97, Busan, South Korea, May 27-31, 2013, S2-132182, Change Request, 2 pages.

International Search Report and Written Opinion dated Mar. 3, 2014 issued in PCT/EP2013/062383. (23 pages).

\* cited by examiner

NETWORK INITIATED CS SERVICES DURING IMS CALL

CROSS-REFERENCE TO RELATED APPLICATIONS

This is a divisional of U.S. application Ser. No. 14/785,743, which has a section 371(c) date of Oct. 20, 2015 (published as U.S. 20160072852) and which is the section 371 national stage application of international patent application no. PCT/EP2013/062383, filed on Jun. 14, 2013, which claims priority to U.S. provisional application No. 61/808,394, filed on Apr. 4, 2013. The above identified applications and publication are incorporated by this reference.

TECHNICAL FIELD

The present embodiments relate to telecommunications, and in particular to handling of a termination of a terminating circuit switched signaling service to a terminal via a circuit switched access of a mobile network. Methods, nodes, a terminal, a communication system, and computer programs are also described.

BACKGROUND

Third Partnership Project (3GPP) Technical Specification (TS) 23.272 V11.4.0 (2013-03) defines that a terminal connected to a mobile network performs a Circuit Switched Fallback (CSFB) procedure in case of a Network (NW)-initiated circuit switched signaling service. The latter document also defines the handling of a Mobile Terminating Location Request (MT-LR) signaling service in a case in which an Internet Protocol (IP) Multimedia Subsystem (IMS) voice call is on-going.

SUMMARY

It is an object of the invention to provide measures with which an interruption of a call which is established or which is currently being established via an internet protocol domain of a mobile network may be avoided during a handling of a circuit switched signaling service to be terminated to a terminal and being different from a mobile terminating location request service. It is also an object of the invention to provide corresponding methods, nodes, a corresponding terminal, a corresponding communication system and corresponding computer programs.

The objects defined above are solved by methods comprising the features of embodiment 1, 6 or 15, a control node comprising the features of embodiment 18, a terminal comprising the features of embodiment 20 or 22, a communication system comprising the features of embodiment 24, and computer programs comprising the features of embodiment 25.

According to an exemplary aspect of the invention, a method to be used in association with terminating a circuit switched signaling service to a terminal via a circuit switched access of a mobile network is provided. The signaling service is different from a voice call via the circuit switched access and from a mobile terminating location request service. A call via an internet protocol domain of the mobile network and a packet switched access of the mobile network is or is being established for the terminal. The method is performed by a control node of the mobile network. The method comprises receiving a paging request for paging the terminal via the packet switched access. The paging request is for the circuit switched signaling service. The method comprises determining whether a call via the internet protocol domain and the packet switched access is or is being established for the terminal depending on the received paging request. The method comprises sending a paging rejection for rejecting the received paging request depending on the call via the internet protocol domain and the packet switched access is or is being established for the terminal and sending, via the packet switched access, a paging request for paging the terminal depending on the call via the internet protocol domain and the packet switched access is not or is being not established for the terminal.

According to another exemplary aspect of the invention, a method to be used in association with terminating a circuit switched signaling service to a terminal via a circuit switched access of a mobile network is provided. The signaling service is different from a voice call via the circuit switched access and from a mobile terminating location request service. A call via an internet protocol domain of the mobile network and a packet switched access of the mobile network is or is being established for the terminal. The method is performed by the terminal and comprises receiving, via the packet switched access, a paging request for paging the terminal. The paging request is for the circuit switched signaling service. The method comprises determining whether a call via the internet protocol domain and the packet switched access is or is being established for the terminal depending on the received paging request. The method comprises sending, via the packet switched access, a paging rejection for rejecting the paging request by the terminal depending on the call via the internet protocol domain and the packet switched access is or is being established for the terminal and sending a paging response for accepting the paging request by the terminal depending on the call via the internet protocol domain and the packet switched access is not or is being not established for the terminal.

According to another exemplary aspect of the invention, a method to be used in association with terminating a circuit switched signaling service to a terminal via a circuit switched access of a mobile network is provided. The signaling service is different from a voice call via the circuit switched access and from a mobile terminating location request service. A call via an internet protocol domain of the mobile network and a packet switched access of the mobile network is or is being established for the terminal. The method is performed by the terminal and comprises receiving a paging request for paging the terminal via the packet switched access. The paging request is for the circuit switched signaling service. The method comprises determining whether a signaling service via the internet protocol domain is available for the terminal depending on the received paging request. The signaling service via the internet protocol domain corresponds to the circuit switched signaling service. The method comprises sending, via the packet switched access, a support indication indicating a terminal support for the signaling service via the internet protocol domain depending on the signaling service via the internet protocol domain being available for the terminal.

According to another exemplary aspect of the invention, a control node for a mobile network is provided. The control node is usable in association with terminating a circuit switched signaling service to a terminal via a circuit switched access of a mobile network. The signaling service is different from a voice call via the circuit switched access and from a mobile terminating location request service. A call via an internet protocol domain of the mobile network and a packet switched access of the mobile network is or is being established for the terminal. The control node is adapted to receive a paging request for paging the terminal via the packet switched access. The paging request is for the circuit switched signaling service. The control node is adapted to determine whether a call via the internet protocol domain and the packet switched access is or is being established for the terminal depending on the received paging request. The control node is adapted to send a paging rejection for rejecting the received paging request depending on the call via the internet protocol domain and the packet switched access is or is being established for the terminal and to send, via the packet switched access, a paging request for paging the terminal depending on the call via the internet protocol domain and the packet switched access is not or is being not established for the terminal.

According to another exemplary aspect of the invention, a terminal to be usable in association with terminating a circuit switched signaling service to the terminal via a circuit switched access of a mobile network is provided. The signaling service is different from a voice call via the circuit switched access and from a mobile terminating location request service. A call via an internet protocol domain of the mobile network and a packet switched access of the mobile network is or is being established for the terminal. The terminal is adapted to receive, via the packet switched access, a paging request for paging the terminal. The paging request is for the circuit switched signaling service. The terminal is adapted to determine whether a call via the internet protocol domain and the packet switched access is established for the terminal depending on the received paging request. The terminal is adapted to send, via the packet switched access, a paging rejection for rejecting the paging request depending on the call via the internet protocol domain and the packet switched access is or is being established for the terminal and to send a paging response for accepting the paging request depending on the call via the internet protocol domain and the packet switched access is not or is being not established for the terminal.

According to another exemplary aspect of the invention, a terminal to be usable in association with terminating a circuit switched signaling service to the terminal via a circuit switched access of a mobile network is provided. The signaling service is different from a voice call via the circuit switched access and from a mobile terminating location request service. A call via an internet protocol domain of the mobile network and a packet switched access of the mobile network is or is being established for the terminal. The terminal is adapted to receive a paging request for paging the terminal via the packet switched access. The paging request is for the circuit switched signaling service. The terminal is adapted to determine whether a signaling service via the internet protocol domain is available for the terminal depending on the received paging request. The signaling service via the internet protocol domain corresponds to the circuit switched signaling service. The terminal is adapted to send, via the packet switched access, a support indication indicating a terminal support for the signaling service via the internet protocol domain depending on the signaling service via the internet protocol domain being available for the terminal.

According to another exemplary aspect of the invention, a communication system for terminating a circuit switched signaling service to the terminal via a circuit switched access of a mobile network is provided. The communication system comprises at least one of a control node described above and a terminal described above.

According to another exemplary aspect of the invention, a computer program to be executable by at least one processor is provided. The execution of the computer program causes a control node to perform a method described above.

According to another exemplary aspect of the invention, a computer program to be executable by at least one processor is provided. The execution of the computer program causes a terminal to perform a method described above.

The foregoing and other objects, features and advantages of the embodiments will become more apparent in the following detailed description of embodiments as illustrated in the accompanying drawings.

DETAILED DESCRIPTION

Figure 1:
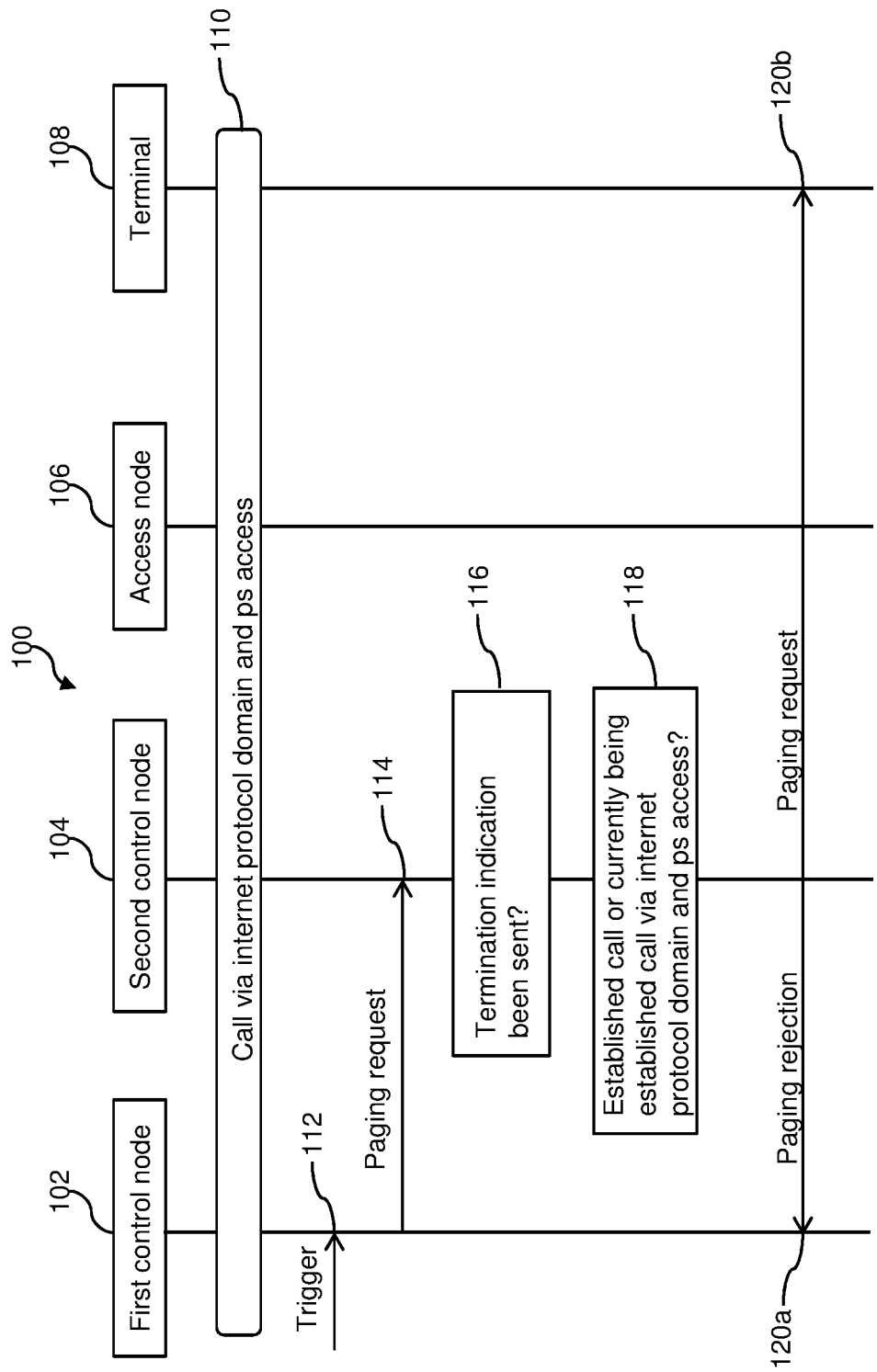
FIG. 1 is a flow diagram illustrating a method to be used in association with terminating a circuit switched signaling service to a terminal via a circuit switched access of a mobile network according to an embodiment.

It is noted that the illustration in the drawings is schematic. Further, in different figures, identical or similar steps or elements are provided with the same reference numerals or with reference numerals which are different from the corresponding reference numerals only within the first digit.

In the following, methods, nodes, a terminal, a communication system, and computer programs to be used in association with terminating a circuit switched signaling service to a terminal via a circuit switched access of a mobile network according to embodiments are described in more detail.

According to embodiments, a terminal may connect or may be connected to a mobile network or cellular network by means of a call via an internet protocol domain of the mobile network and a packet switched access the mobile network. The terminal may be attached to the mobile network and the latter mentioned call may be currently being established for the terminal or in other words the call establishment may be currently in progress. In this respect, a bearer for the call may be established and optionally signaling related to the call establishment may also be exchanged. Alternatively, the call may be already established, particularly for the terminal. A circuit switched signaling service is to be terminated to the terminal via a circuit switched access of the mobile network. The circuit switched signaling service may be different from or compared to a voice call established, currently being established or to be established via the circuit switched access of the mobile network and/or a mobile terminating location request signaling service, particularly a MT-LR signaling service mentioned in the background section.

To this end, in a first embodiment, a control node of a packet switched domain of the mobile network might not send a paging request to the terminal depending on a result of a determination performed by the control node and pertaining to whether the call via the internet protocol domain is or is currently being established for the terminal or not. In a case in which a call is established or is currently being established, the control node may send a paging rejection to the network subsequent to a received paging request instead of sending the paging request to the terminal. In a second embodiment, the terminal may be capable of rejecting a received paging request, particularly by sending a paging rejection, depending on a result of a determination performed by the terminal and pertaining to whether the call via the internet protocol domain is or is currently being established for the terminal or not. In a third embodiment, the terminal can initiate a termination of a corresponding signaling service via the internet protocol domain instead of the circuit switched signaling service depending on a result of a determination performed by the terminal and pertaining to whether such a corresponding signaling service being available or not particularly for the terminal.

In the second and third embodiments, the terminal may additionally determine whether a call continuity procedure, for example Single Radio Voice Call Continuity (SRVCC), should be applied or not for the call established or currently being established via the internet protocol domain. In this respect, the terminal may determine whether the call continuity procedure should be applied for transferring the call from the packet switched access to the circuit switched access. The terminal may perform the call continuity procedure depending on a result of the determination. For example, SRVCC can be performed for the call being an in pre-alerting state, i.e. in a state in which a corresponding bearer for the call is established and signaling for the call establishment has been transmitted. In the pre-altering state ringing tones might not be transmitted yet. A corresponding mode of the terminal may be called pre-alternating mode. SRVCC can also be performed for the call being in an alerting state, i.e. in a state in which the bearer for the call is established, but the call is not established yet. Ringing tones for the call may be already transmitted. A corresponding mode of the terminal may be called alerting mode. SRVCC can be also performed for an established call, i.e. when the call and the corresponding bearer is established. In this case, the call can be also in its held state, where the communication for the call is currently suspended.

The result of the above mentioned determinations may contribute to the above specified action of the control node and the terminal, respectively. A further result of one or more further determinations may also impact the action of the control node and the terminal, respectively, to be performed. Hence, the action to be performed by the respective entity may have multiple dependencies. Hence, the action of the respective entity may be caused by a result of one or more determinations.

The inventors have beneficially recognized that measures to be used in association with terminating a circuit switched signaling service different from a mobile terminating location request signaling service during a call of the terminal established or currently being established via the internet protocol domain of the mobile network are not existing so far. The above described embodiments may therefore enable that an interruption of the established call or the call being currently established may be omitted.

In the following, further embodiments of the method performed by the control node will be described. It is noted that these embodiments may similarly apply to the method performed by the terminals, the control node, the terminals, the communication system, and/or the computer programs.

In particular, the term "adapted" can particularly denote "embodied" in this application.

In particular, the circuit switched signaling service may be embodied as terminating signaling service, i.e. a signaling service to be terminated to the terminal.

In particular, as mentioned above, the term "mobile network" may denote a cellular network or a communication network, in which a communication between a terminal and the network may be wireless.

In particular, the circuit switched signaling service can be network initiated and/or may be adapted, for example, as a non call related signaling service. Such a non call related service may be a supplementary service, for example an Unstructured Supplementary Service Data (USSD) service or an Unregistered Digital Information (UDI). UDI may be used between terminals.

The step of determining may comprise determining whether bearer information for the terminal may be available in the control node, the bearer information indicating that a bearer for transporting a call via the internet protocol domain and the packet switched access may be established for the terminal, and the step of sending the paging rejection may be performed depending on the bearer information for the terminal being available in the control node, wherein the step of sending the paging request may be performed depending on the control node being free of the bearer information for the terminal.

The method may further comprise determining whether the control node may have sent a termination indication to the terminal, the termination indication indicating that a circuit switched short messaging service may be terminatable to the terminal via the packet switched access, wherein the step of sending the paging rejection may be performed depending on the control node having sent the termination indication, wherein the step of sending the paging request via the packet switched access may be performed depending on the control node having not sent the termination indication.

The method may further comprise starting a timer and a counter in the control node in response to the received paging request, the timer running for a predetermined time interval, the counter counting a number of paging requests received by the control node, receiving at least a further paging request for paging the terminal via the packet switched access, and sending, via the packet switched access, a further paging request depending on a counted number of received paging requests being equal to or exceeding a predetermined number of paging requests within the predetermined time interval.

At least one of the received paging request, the received at least further paging request, the sent paging request and the sent further paging request may comprise an identification of the circuit switched signaling service, particularly a Supplementary Service service Identification.

In the following, further embodiments of the method performed by the terminal and comprising the step of determining whether a call is or is currently being established will be described. It is noted that these embodiments may similarly apply to the method performed by the respective other entities, the control node, the terminals, the communication system, and/or the computer programs.

In particular, the paging rejection sent by the terminal may be a paging error for indicating an unsuccessful handling of the paging request by the terminal.

In particular, the paging response sent by the terminal may be for indicating a successful handling of the paging request by the terminal alternatively or additionally to for accepting the paging request.

The step of determining may comprise using information provided from a first protocol layer in the terminal, particularly an Internet Protocol Multimedia Subsystem layer, to a lower second protocol layer in the terminal, particularly a Non Access Stratum layer.

The information may be provided from the first protocol layer upon request from the lower second protocol layer.

The method may further comprise at least one of determining whether the terminal may will receive the circuit switched signaling service, and determining whether the terminal may will perform a call continuity procedure for the call from the packet switched access to the circuit switched access, wherein the step of sending the paging rejection may be performed depending on the terminal may will receive the circuit switched signaling service and/or depending on the terminal may will perform the call continuity procedure.

The paging rejection may comprise a call continuity indication indicating to initiate, for the call of the terminal, a call continuity procedure from the packet switched access to the circuit switched access, particularly an error code of a first type.

The method may further comprise performing the call continuity procedure for the call of the terminal subsequent to an access node of the mobile network requesting to perform the call continuity procedure.

The step of sending the paging rejection may be performed depending on the terminal might will not receive the circuit switched signaling service and/or depending on the terminal might will not perform the call continuity procedure, and/or wherein the sent paging rejection may comprise an error indication indicating a rejection of the paging request by the terminal, particularly an error code of a second type.

The method may further comprise determining whether a signaling service via the internet protocol domain may be available for the terminal, the signaling service via the internet protocol domain corresponding to the circuit switched signaling service to be terminated, and sending, via the packet switched access, a support indication indicating a terminal support for the signaling service via the internet protocol domain depending on the signaling service via the internet protocol domain being available for the terminal.

The method may further comprise determining whether the terminal may be registered in the signaling service via the internet protocol domain, wherein the support indication may be sent together with a registration request for registering in the signaling service via the internet protocol domain depending on the terminal being not registered in the signaling service via the internet protocol domain, wherein the support indication may be sent without the registration request for registering in the signaling service via the internet protocol domain depending on the terminal being registered in the signaling service via the internet protocol domain.

In the following, further embodiments of the method performed by the terminal and comprising the step of determining whether a corresponding signaling service being available will be described. It is noted that these embodiments may similarly apply to the method performed by the respective other entities, the control node, the terminals, the communication system, and/or the computer programs.

The method may further comprise sending, via the packet switched access, a paging rejection for rejecting the paging request depending on the received paging request and particularly depending on a result of the step of determining.

The method may further comprise determining whether a call via the internet protocol domain and the packet switched access may be or may be being established for the terminal depending on the received paging request, wherein the step of sending the paging rejection may be performed depending on the call via the internet protocol domain and the packet switched access may be or may be being established for the terminal.

In the following, further embodiments of the control node will be described. It is noted that these embodiments may similarly apply to the methods, the terminals, the communication system, and/or the computer programs.

The control node may be adapted to perform the method as described above.

In the following, further embodiments of the terminal will be described. It is noted that these embodiments may similarly apply to the methods, the control node, the respective other terminal, the communication system, and/or the computer programs.

The terminal may be adapted to perform the method as described above.

Referring to FIG. 1, a method to be used in association with terminating a circuit switched signaling service to a terminal via a circuit switched access of a mobile network according to an embodiment will be explained.

A respective mobile network 100 comprises a first control node 102, a second control node 104, and an access node 106. A terminal 108 is connectable to the mobile network 100. The first control node 102 can be part of a circuit switched domain of a core network of the mobile network 100 and can be adapted as a Mobile Switching Center (MSC). The first control node 102 may further be adapted to control a payload and signaling transmission via the circuit switched access of the mobile network 100. The second control node 104 can be part of a packet switched domain of the core network of the mobile network 100 and may be adapted as a Mobility Management Entity (MME). The second control node 104 may be further adapted to control a payload and signaling transmission via a packet switched access of the mobile network 100. The circuit switched access and/or the packet switched access may be adapted as radio access network. The circuit switched access may be embodied as, for example, a Global System for Mobile Communications (GSM) Enhanced Data Rates for GSM Evolution (EDGE) Radio Access Network (GERAN) or Universal Mobile Telecommunications System (UMTS) Terrestrial Radio Access Network (UTRAN) access network, and the packet switched access may be embodied as a Long Term Evolution (LTE) network.

The mobile network 100 further comprises an internet protocol domain, for example an Internet Protocol (IP) Multimedia Subsystem (IMS) domain. The access node 106 may be part of the packet switched access and may be adapted as an eNodeB. The terminal 108, for example a cellular phone or a tablet, is attached via the packet switched access to the second control node 104 and further to the internet protocol domain. The method is performed by the second control node 104. Further steps in FIG. 1 which are not performed by the second control node 104 are also labeled by a reference numeral for ease of explanation.

As illustrated by a first step 110, a call via the internet protocol domain and the packet switched access is established for the terminal 108, and the terminal 108 is in an active mode, i.e. the terminal 108 can send data to and/or receive data from a radio access, here the packet switched access. In its active mode, the terminal 108 can also currently communicate with a peer end of the established call. Alternatively, the call via the internet domain and the packet switched access may be currently being established for the terminal 108. In the latter option, the terminal 108 may be also in its active mode. The call may be adapted as IMS voice call, an IMS video call or an IMS Voice over Internet Protocol (VoIP) call. It is noted that the abbreviation "ps" in the Figures denotes "packet switched" and the abbreviation "cs" in the Figures denotes "circuit switched".

In response to a trigger message received by the first control node 102 in a step 112, the first control node 102 sends in a step 114 a paging request for paging the terminal 108 via the packet switched access to the second control node 104. The paging request is associated with the circuit switched signaling service to be terminated to the terminal 108. In this respect, the paging request may be sent via a particular interface between the first and second control nodes 102, 104, particularly a SGs interface. The paging request may comprise a corresponding identification of the circuit switched signaling service to be terminated to the terminal 108 via the circuit switched access. The identification may be configured as a Supplementary Service (SS) service Identification (ID) or SS Code, for example defined in accordance with TS 29.009 V11.0.0 (2012-09) or TS 29.002 V12.0.0 (2013-03). The identification may be included in the paging request in a case in which the identification may be specified, for example in the latter mentioned Technical Specifications. Additionally or alternatively, the identification may have to be included in the paging request in a case in which a non-call related supplementary service should be indicated. In a case of USSD, a recipient of the paging request may recognize the kind of signaling service from the paging request. The circuit switched signaling service is different from a voice call established via the circuit switched access and from a mobile terminating location request service, for example a Mobile Terminating Location Request (MT-LR) service as defined in TS 23.272 V11.4.0 (2013-03). Further, the circuit switched signaling service can be network initiated and/or may be adapted, for example, as a non call related signaling service, for example in the form of a USSD service.

The second control node 104 receives the paging request in the step 114. The second control node 104 determines in response to the received paging request in a next step 116 whether the second control node 104 has previously sent a termination indication to the terminal 108 particularly in response to a receipt of the termination indication from the terminal 108. For example, the termination indication may have been previously sent during an attach procedure of the terminal 108 for attaching to the mobile network 100 or during a location update procedure for updating a location of the terminal both to the packet switched access and the circuit switched access, particularly a combined Tracking Area (TA) and Location Area (LA) Update. The termination indication indicates that a circuit switched short messaging service, for example a SMS service, is terminatable to the terminal 108 via the packet switched access by the second control node 104, hence the second control node 104 supports the termination of the circuit switched short messaging service to the terminal 108 via the packet switched access. The termination indication can be adapted as "SMS only" indication associated with CSFB for only SMS service. Sending the termination indication by the second control node 104 may imply that a circuit switched short messaging service can be terminated to the terminal 108 without performing the circuit switched fallback procedure, since this particular signaling service can also be terminated via the packet switched access. Hence, sending a paging request from the second control node 104 to the terminal 108 via the packet switched access may be superfluous. Not sending the termination indication may require the terminal 108 to perform the circuit switched fallback procedure, in order to receive a circuit switched signaling service. Hence, a paging request for the circuit switched signaling service may have to be sent from the second control node 104 to the terminal 108.

A determination rule associated with the determination in the step 116 may set forth that the paging request is to be rejected by a corresponding paging rejection for rejecting the received paging request in a case in which the determination is in the affirmative and that a paging request is to be sent to the terminal 108 else. The paging request to be sent to the terminal 108 may be specified to be the paging request received in the step 112, thereby the second control node 104 forwarding the paging request received from the first control node 102 to the terminal 108. It is assumed that the determination in this embodiment is in the affirmative.

In a next step 118, the second control node 104 determines whether a call via the internet protocol domain and the packet switched access is established or is being established for the terminal 108 depending on the received paging request. To this end, the second control node 104 determines whether bearer information, particularly for the terminal 108, is available in the second control node 104. The bearer information indicates that a bearer for transporting a call via the internet protocol domain and the packet switched access is established for the terminal 108. The bearer information may indicate a call via the internet protocol domain and the packet switched access being, at least potentially, established for the terminal 108. In this respect, a bearer may be considered to be an information transmission context or path of defined characteristics, for example capacity, delay and/or bit error rate. The bearer information may be specific for the terminal in that the bearer may be established for the terminal 108. For example, the bearer information can be adapted as information related to an EPS bearer particularly associated with the terminal 108, for example information related to a QCI=1 bearer which may be set up for the terminal 108. Since the bearer information may be present in the second control node 104 in a case in which the call via the internet protocol domain may be established or the call establishment of such a call may be still in progress, the determination in the step 118 may employ the assumption that a call via the internet protocol domain may potentially be established if the bearer information are present.

A determination rule associated with this determination step 118 may specify that the paging request may be rejected by a paging rejection to be sent to the first control node 102 in a case in which the determination is in the affirmative and that a paging request may be sent to the terminal 108 in a case in which the determination is not in the affirmative. Further, the paging request to be sent to the terminal 108 can be specified in the second control node 104 to be the paging request received from the first control node 102, as is described above. The circuit switched signaling procedure may be terminated in accordance with a mobile terminating call procedure, for example as described in TS 23.272 V11.4.0 2013-03), clause 7. In the described embodiment, the determination is assumed to be in the affirmative.

The step 118 can be performed prior to the step 116.

In order to account for the two successively performed determinations and the determination rules thereof, a combined determination rule of the second control node 104 may specify that the paging request is rejected by sending a paging rejection to the first control node 102 in a case in which the determination in the step 116 is in the affirmative, the determination in the step 118 is in the affirmative or the determination in the steps 116 and 118 are both in the affirmative. On the contrary, according to the combined determination rule, the paging request is to be sent, particularly from the second control node 104, via the packet switched access to the terminal 108 in a case in which the determination in the step 116 and 118 are both not in the affirmative. Further, the paging request to be sent may be specified to be the paging request received from the first control 102, hence the second control node 104 is to forward the received paging request to the terminal 108 via the packet switched access. The forwarded paging request therefore may comprise the identification of the circuit switched signaling service to be terminated. Alternatively, the paging request to be sent may be specified in the second control node 104 to be a paging request different from the received paging request. Hence the sent paging request might not comprise the identification of the circuit switched signaling service.

Additionally or alternatively, the sent paging request and the forwarded paging request, respectively, may be for the circuit switched signaling service in that the terminal 108 may be capable of differentiating between a paging associated with a circuit switched signaling service and other kind of paging purposes. In this respect, the respective paging request may comprise a protocol marking, for example a core network domain indication indicating a circuit switched domain of the mobile network such that the terminal 108 may recognize that the paging is for a circuit switched fallback procedure. Such a core network domain indication may be embodied as a Core Network (CN) Domain indicator as specified in TS 23.401 V12.0.0 (2013-03). Additionally or alternatively, the respective paging request may comprise parameters as specified in TS 23.401 V12.0.0 (2013-03).

Additionally or alternatively, the sent paging request and the forwarded paging request, respectively, may comprise the identification of the circuit switched signaling service mentioned above. Additionally or alternatively, the identification may be included in the respective paging request in a case in which the identification may be specified, for example in the above mentioned Technical Specifications. Additionally or alternatively, the identification may have to be included in the respective paging request in a case in which a non-call related supplementary service should be indicated. In a case of USSD, a recipient of the respective paging request may recognize the kind of signaling service from the respective paging request. Additionally or alternatively, the respective paging request may have to comprise the identification in a case in which the terminal 108 may be in its active mode. Therefore the terminal 108 may be informed by the respective paging request for which service the terminal 108 may be paged. For example, the terminal 108 can be informed of a short messaging service, hence SMS, a call, or a USSD service.

In a next step 120a, the paging request is rejected by the second control node 104 by sending a paging rejection to the first control node 102 depending on the previously performed determinations, particularly depending on the result of the previously performed determinations. Further, the termination of the circuit switched signaling service may be cancelled by the first control node 102 and a circuit switched fallback procedure for the terminal 108 may stop. The circuit switched fallback procedure may have been initiated by the first control node 102 of the mobile network 100, for example because of the circuit switched signaling service being embodied as a terminating signaling service, in order to enable the terminal 108 to receive the terminating circuit switched signaling service via the circuit switched access. Thereupon the method stops.

Alternatively, a paging request may be sent in a step 120b to the terminal 108 in a case in which the determination in the steps 116 and 118 are both not in the affirmative. The initiated circuit switched fallback procedure may therefore continue.

The step 116 may be omitted in the method.

Figure 2:
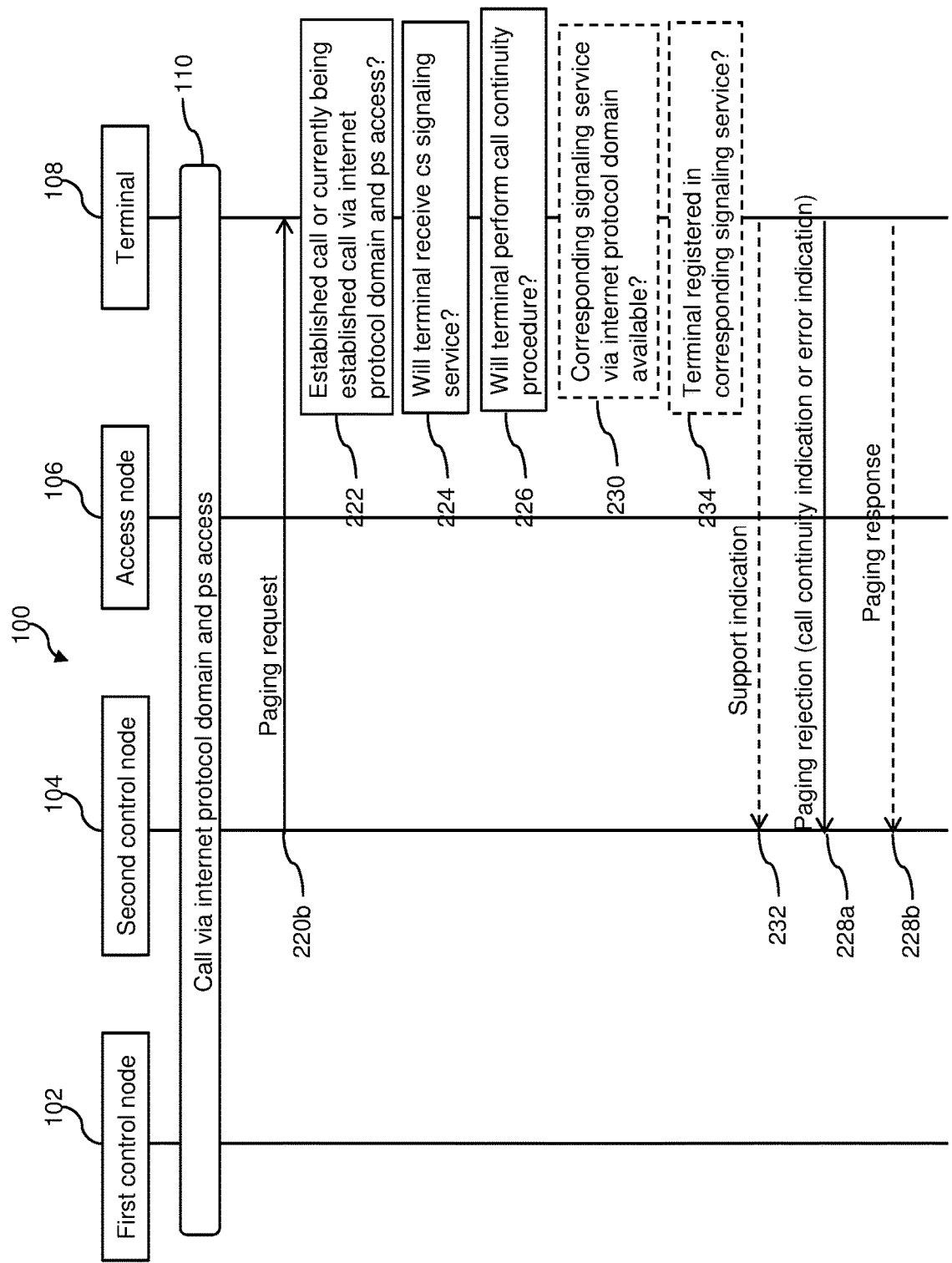
FIG. 2 is a flow diagram illustrating a method to be used in association with terminating a circuit switched signaling service to a terminal via a circuit switched access of a mobile network according to another embodiment.

Referring to FIG. 2, a method to be used in association with terminating a circuit switched signaling service to a terminal via a circuit switched access of a mobile network according to another embodiment will be explained. The mobile network 100 associated with this method is similar to the mobile network 100 described in FIG. 1 and the circuit switched signaling service to be terminated is identical to the circuit switched signaling service described in FIG. 1. Communication in the mobile network 100 may be adapted as a protocol layer stacked communication. The method is performed by the terminal 108. Further steps in FIG. 2 which are not performed by the terminal 108 are also labeled by a reference numeral for ease of explanation.

As illustrated by a first step 110, a call via the internet protocol domain and the packet switched access is established for the terminal 108, and the terminal 108 is in an active mode. Alternatively, the call via the internet domain and the packet switched access may be currently being established for the terminal 108. The call may be adapted as IMS voice call, an IMS video call or an IMS VoIP call.

In a step 220b, the terminal 108 receives a paging request from the second control node 104 via the packet switched access. The paging request may be the paging request sent in the step 120b of FIG. 1. The paging request is for the circuit switched signaling service to be terminated, particularly as explained with reference to the sent paging request and forwarded paging request, respectively, of FIG. 1, and may comprise an identification of the circuit switched signaling service to be terminated to the terminal 108. In a next step 222, the terminal 108 determines whether a call via the internet protocol domain and the packet switched access is established or is currently being established for the terminal 108. The determination is triggered by the receipt of the paging request in the step 220b.

To this end, the terminal 108 uses terminal information about the presence of a call which is or is currently being established via the internet protocol domain and the packet switched access for the terminal 108. The information may be instantaneously provided by a first protocol layer of the stacked protocol layers in the terminal 108 to a lower second protocol layer of the stacked protocol layers in the terminal 108. The first protocol layer may be associated with the communication via the internet protocol domain and may be adapted, for example, as an IMS layer. The second protocol layer may be associated with the communication between the packet switched access and the packet switched domain of the core network, respectively, and the terminal 108 and may be adapted as a Non Access Stratum (NAS) layer. Alternatively, the information may be requested by the second protocol layer from the first protocol layer upon receipt of the paging request. The first protocol layer then provides the requested information to the second protocol layer.

The first protocol layer of the terminal 108 may beneficially be capable of determining whether a call is established or is currently being established irrespectively of a default radio bearer or a dedicated radio bearer being used for potentially transporting the audio data of the respective call. In this respect, the terminal 108 may use traffic flow templates defined in the terminal 108 to map the traffic flow to the default radio bearer or to the dedicated radio bearer. The radio bearer may run from the terminal 108 towards an access node of the mobile network where a bearer towards the second control node may commence. Further, the first protocol layer of the terminal 108 may be aware of a present call being in a pre-altering state or alerting state as corresponding signaling have already been exchanged via the first protocol layer. Therefore, the method described in FIG. 2 can be beneficially combined with the method described in FIG. 1 in the case of a default bearer being established via the second control node 104 and leading to the determination of the step 118 being not in the affirmative.

A determination rule in the terminal 108 associated with the determination in the step 222 may specify that the paging request may be rejected by sending a paging rejection to the second control node 104 via the packet switched access in a case in which the determination is in the affirmative and that a paging response for indicating to continue with the termination of the circuit switched signaling service may be sent to the second control node 104 in a case in which the determination is not in the affirmative. Thus, the second control node 104 may be informed in the first mentioned case that the paging request was received and handled by the terminal 108, but was rejected by the terminal 108. In the second case, the terminal 108 may accept the paging request from the second control node 104 by sending the paging response. The paging rejection may comprise a call continuity indication or an error indication. The call continuity indication indicates to initiate, for the call of the terminal 108, a call continuity procedure from the packet switched access to the circuit switched access, particularly Single Radio Voice Call Continuity (SRVCC). In this respect, the term "call continuity procedure from the packet switched access to the circuit switched access" may particularly denote a procedure with which a call may be continued via the circuit switched access by transferring the call from the packet switched access to the circuit switched access. Further, the call continuity indication may comprise or may be configured as an error code of a first type. The error indication may indicate to the mobile network 100 that the paging request was received by the terminal 108 but not accepted and hence rejected by the terminal 108 and that the call continuity procedure might not to be initiated by the mobile network 100. The error indication may comprise or may be configured as an error code of a second type. The terminal 108 may determine whether to include the call continuity indication or the error indication into the paging rejection using local information in the terminal 108. The local information may comprise, for example amongst other, the information explained below with reference to subsequent steps 224, 226. In the described embodiment, the determination is assumed to be in the affirmative.

In a next step 224, the terminal 108 determines whether the terminal 108 will or voluntarily would like to receive the circuit switched signaling service, for example in terms of the terminal 108 giving the circuit switched signaling service precedence over other services and/or a call. In other words, the terminal 108 may determine whether the terminal 108 may want to receive the circuit switched signaling service. A corresponding determination rule in the terminal 108 may specify that the terminal 108 may send the paging rejection comprising the above described call continuity indication in a case in which the determination is in the affirmative and may send the paging rejection comprising the above described error indication in a case in which the determination is not in the affirmative. The determination is assumed to be in the affirmative in this embodiment.

In a or the next step 226, the terminal 108 may determine whether the terminal 108 will or voluntarily would like to perform a call continuity procedure for the call, for example in terms of the terminal 108 giving the performance of the call continuity procedure precedence over not performing the call continuity procedure and/or not acting in this respect. In other words, the terminal 108 may determine whether the terminal 108 may want to perform the call continuity procedure. A corresponding determination rule in the terminal 108 may specify that the terminal 108 may send the paging rejection comprising the above described call continuity indication in a case in which the determination is in the affirmative and may send the paging rejection comprising the above described error indication in a case in which the determination is not in the affirmative. In the described embodiment, the determination is in the affirmative.

Information about capabilities of the terminal 108, user specific settings in the terminal 108 and/or user input which may be input into the terminal 108 may be used for the determinations in the steps 224 and/or 226.

In a next step 228a, the terminal 108 sends the paging rejection to the second control node 104, in which paging rejection the terminal 108 has previously included the call continuity indication prior to the sending of the paging rejection.

In a case in which the determination in the step 222 is not in the affirmative, the terminal 108 may send a paging response to the second control node 104 in a step 228b.

The step 224 and/or the step 226 may be omitted in the method.

In a case in which the termination in the step 222 may be in the affirmative and/or in which one or more of the determinations in the steps 224, 226 may be not in the affirmative, the terminal 108 may send the paging rejection in the step 228a in which the terminal 108 may have included the error indication.

Further, subsequent to the step 226 and prior to the steps 228a, 228b, the terminal 108 may determine, for example based on the identification of the circuit switched signaling service included in the received paging request, in an optional step 230 whether a signaling service via the internet protocol domain is available for the terminal 108. The signaling service via the internet protocol domain corresponds to the circuit switched signaling service to be terminated in terms of offering a similar or identical service to the terminal 108. In this respect, the corresponding signaling service may offer the same, less or more functionality compared to the circuit switched signaling service. The corresponding signaling service may offer a similar functionality to the terminal 108. A corresponding determination rule to be used in the step 230 specifies that the terminal 108 may send a support indication to the second control node 104 via the packet switched access in a case in which the signaling service in question is available and else omit to send a support indication. The step of sending the support indication is indicated in FIG. 2 by a reference numeral 232. The step 232 can be performed prior or subsequent to the step 228a, 228b. The step 232 can also be performed simultaneously to the step 228a.

Assuming the determination of the step 230 to be in the affirmative, the terminal 108 may then further determine in an optional next step 234 whether the terminal 108 has already registered in the corresponding signaling service via the internet protocol domain before the sending of the support indication. The step 234 may only be performed if the determination in the step 230 is in the affirmative. Alternatively, the step 234 may be performed irrespectively of a result of the determination in the step 230. A corresponding determination rule in the terminal 108 associated with the step 234 may specify that the terminal 108 may send, via the packet switched access, the support indication in the step 232 together with a registration request for registering the terminal 108 in the corresponding signaling service, if the terminal 108 has not registered in the corresponding signaling service and may else send the support indication without an additional registration request in the step 232. For example, in the first case the support indication can be included in the registration request.

In a case in which the optional steps 230, 234 are performed the paging rejection sent in the step 228a may comprise the error indication or the call continuity indication depending on a pre-configuration in the terminal 108. Such a pre-configuration may overrule a result of the determinations in the steps 222, 224, 226 and/or correspondingly triggered actions.

Assuming the determinations in the steps 230, 234 to be in the affirmative, the corresponding signaling service may be terminated, for example by the mobile network 100, via the packet switched access and the circuit switched fallback procedure for the terminal 108 may be terminated. Further, in such a case, the paging rejection may include the error indication.

Assuming at least one of the determinations in the steps 230, 234 to be not in the affirmative, the circuit switched signaling service may be terminated to the terminal 108. In such a case, the call continuity procedure may be performed or might be not performed. The respective paging rejection may comprise the appropriate indication, i.e. the call continuity indication or the error indication.

A sequence of the steps 222, 224, 226, 230, 234 may be different from the described embodiment. For example, the steps 222, 224, 226 can be performed in an arbitrary sequence compared to the described embodiment. The steps 230 and 234 may be performed prior to any one of the steps 222, 224, 226.

Figure 3:
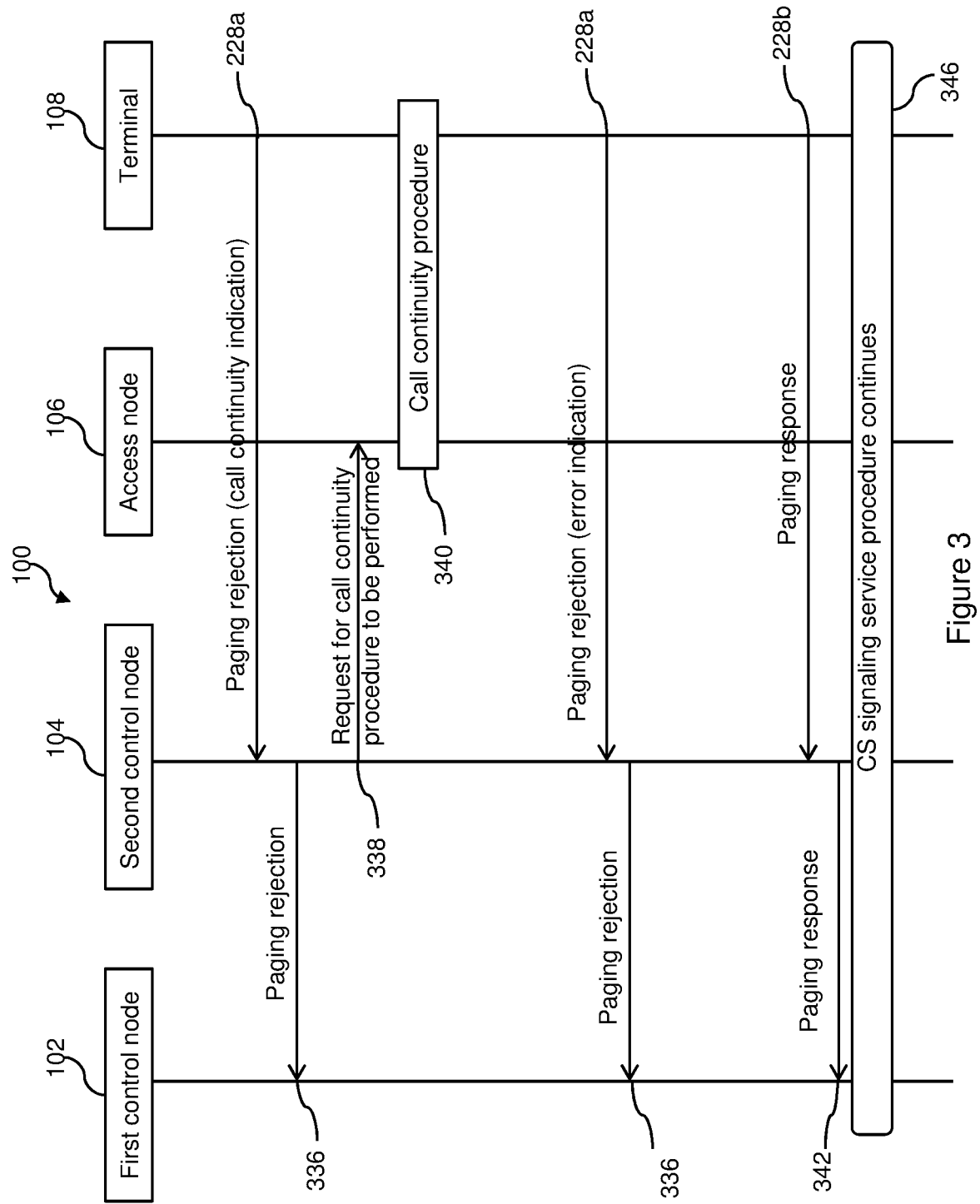
FIG. 3 is a flow diagram illustrating exemplary signaling exchanges performed subsequent to the method of FIG. 2.

Referring to FIG. 3, exemplary signaling exchanges following the method of FIG. 2 will be explained in the following.

In a first configuration illustrated in an upper portion of FIG. 3, it is assumed that the paging rejection is sent in the step 228a from the terminal 108 to the second control node 104 via the packet switched access. The paging rejection comprises the call continuity indication. Subsequent to a receipt of the paging rejection the second control node 104 sends in a step 336 a further paging rejection to the first control node 102 and in a step 338 a request to the access node 106 to initiate the call continuity procedure for the internet protocol domain based call of the terminal 108. Accordingly, the first control node 102 may be informed to continue the applicable circuit switched procedure in the circuit switched access. The access node 106 initiates in a step 340, triggered by the received paging request, the call continuity procedure for the call of the terminal 108. The terminal 108 accordingly participates in the performance of the call continuity procedure, particularly for the call, in the step 340. In accordance with a successful call continuity procedure, the call via the internet protocol domain is transferred from the packet switched access to the circuit switched access. The termination of the circuit switched signaling service to the terminal 108 is then continued to the terminal 108 via the circuit switched access via which access the terminal 108 is then attached to the mobile network 100 and may communicate with a peer end. Hence, the circuit switched fallback procedure may be performed along with the call continuity procedure. For example, the second control node 104 may continue with step 3 of clause 8.3.2.2 of TS 23.272 V11.4.0 (2013-03).

In this configuration, the first control node 102 may be equally used for the call continuity procedure and the circuit switched fallback procedure.

In a second configuration illustrated in a middle portion of FIG. 3, the paging rejection including the error indication is sent from the terminal 108 to the second control node 104 in the step 228a. The second control node 104 sends in a subsequent step 336 a paging rejection to the first control node 102 in response to a receipt of the paging rejection including the error indication. Accordingly, the first control node 102 is informed about the rejection of the paging request of the terminal 108, and the first control node 102 cancels the termination of the circuit switched signaling procedure for the terminal 108 and may also cancel the circuit switched fallback procedure. The call continuity procedure is therefore not performed for the established or currently being established call of the terminal 108. For example, the second control node 104 might not continue with step 3 of clause 8.3.2.2 of TS 23.272 V11.4.0 (2013-03) and may only inform the first control node 102 about the paging rejection.

In a third configuration illustrated in a lower portion of FIG. 3, the terminal 108 sends the paging response to the second control node 104 in the step 228b. The second control node 104 sends in a subsequent step 342 a corresponding paging response to the first control node 102 in response to a receipt of the paging response in the step 228b. Thereupon, the termination of the circuit switched signaling service via the circuit switched access continues in a step 346. To this end, the terminal 108 performs a circuit switched fallback procedure from the packet switched access to the circuit switched access of the mobile network 100, particularly CSFB mentioned above. For example, the first control node 102 may, upon receiving the paging response, continue with circuit switched applicable procedures, for example for supplementary services as specified in TS 23.090 V11.0.0 (2012-09).

Figure 4:
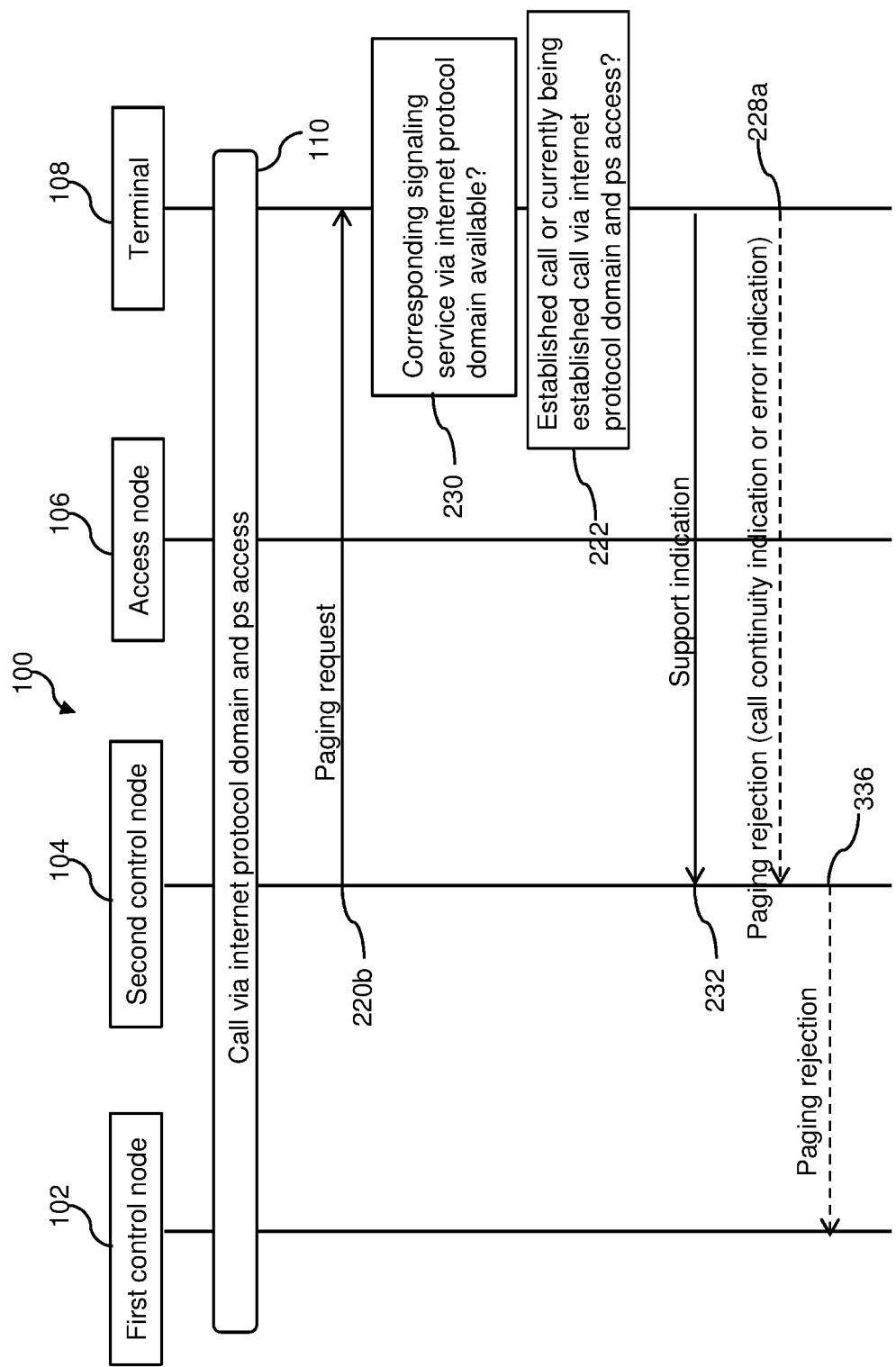
FIG. 4 is a flow diagram illustrating a method to be used in association with terminating a circuit switched signaling service to a terminal via a circuit switched access of a mobile network according to another embodiment.

Referring to FIG. 4, a method to be used in association with terminating a circuit switched signaling service to a terminal 108 via a circuit switched access of a mobile network 100 according to another embodiment will be explained. The mobile network 100 associated with the method is similar to the mobile network 100 described with reference to FIG. 2 and the circuit switched signaling service to be terminated is identical to the circuit switched signaling service described in FIG. 1. The method is performed by the terminal 108. Further steps in FIG. 4 which are not performed by the terminal 108 are also labeled by a reference numeral for ease of explanation.

As illustrated by a step 110, a call via an internet protocol domain of the mobile network 100 and the packet switched access of the mobile network 100 is established for the terminal 108, and the terminal 108 is in an active mode. Alternatively, the call via the internet domain and the packet switched access may be currently being established for the terminal 108. The call may be adapted as IMS voice call, an IMS video call or an IMS VoIP call.

In a step 220b, the terminal 108 receives, via the packet switched access of the mobile network 100 and from the second control node 104, a paging request for paging the terminal 108. The terminal 108 then performs a step 230 and optionally a step 234 (not shown) both being explained with reference to FIG. 2. Thereupon the terminal 108 sends in a step 232 the support indication to the second control node 104, since a corresponding signaling service via the internet protocol domain is available in the described embodiment. In a case in which the determination in the step 234 is performed, the support indication is either sent alone or is sent together with the registration request depending on a result of the step 234 as explained with reference to FIG. 2. The termination of the circuit switched signaling service may be then cancelled by the first control node 104 which has been accordingly informed by the second control node 104. Further, the corresponding signaling service via the internet protocol domain may be terminated to the terminal 108, particularly via the packet switched access. An initiated circuit switched fallback procedure for the terminal 108 may be accordingly cancelled. The method then stops.

Optionally, the terminal 108 may send a paging rejection in a step 228a simultaneously to, subsequent to or before the step 232 in which the support indication is sent, which paging rejection comprises a call continuity indication or an error indication. The terminal 106 may include the respective call continuity indication or error indication depending on a preconfiguration in the terminal 108. Accordingly, the terminal 108 may perform the call continuity procedure or might not perform the call continuity procedure. Thereupon, the second control node 104 may send the paging rejection in an optional step 336 to the first control node 102.

The terminal 108 may also determine in an optional step 222 whether a call via the internet protocol domain is established for the terminal 108. This step 222 may be optionally performed prior to the step 230 and optionally the step 234, subsequent to the step 230 and optionally the step 234 and prior to the step 232, or subsequent to the step 232 and prior to the step 228a. The determination may be performed similarly as described in FIG. 2. In such a case the communication in the mobile network 100 may employ a stack of protocol layers. The terminal 108 may include the call continuity indication or the error indication into the paging rejection to be sent to the second control node 104 depending on a result of the determination in the step 222, as is described in FIG. 2.

The terminal 108 may also perform steps 224, 226 described in FIG. 2, for example prior or subsequent to at least one of the steps 230, 222. The terminal 108 may include the call continuity indication or the error indication into the paging rejection to be sent to the second control node 104 depending on a result of the determination in the step 222, as is described in FIG. 2.

Figure 5:
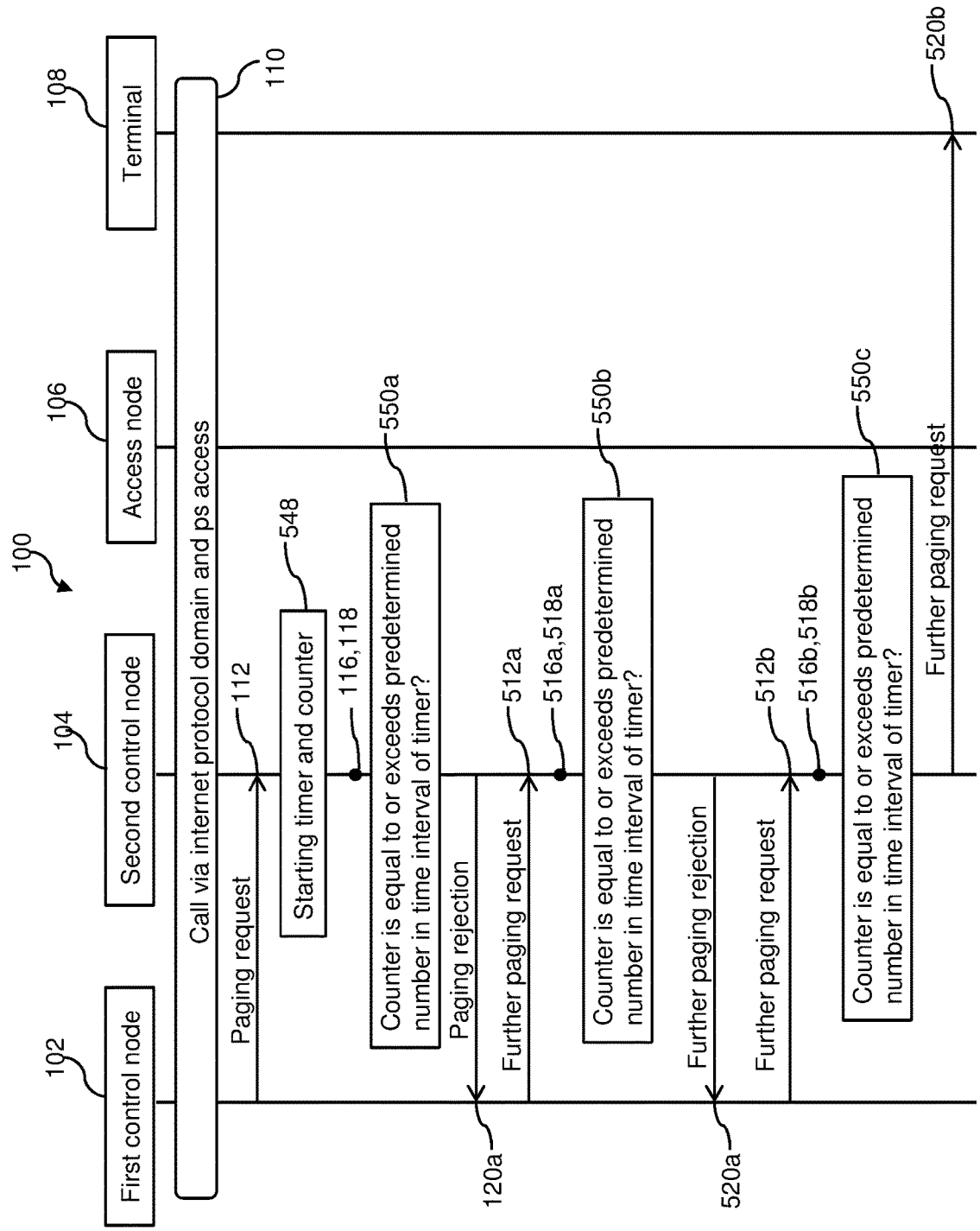
FIG. 5 is a flow diagram illustrating a method to be used in association with terminating a circuit switched signaling service to a terminal via a circuit switched access of a mobile network according to another embodiment.

Referring to FIG. 5, a method to be used in association with terminating a circuit switched signaling service to a terminal 108 via a circuit switched access of a mobile network 100 according to another embodiment will be explained. The mobile network 100 associated with the method is similar to the mobile network 100 described in FIG. 1, and the circuit switched signaling service to be terminated is identical to the circuit switched signaling service described in FIG. 1. The method is performed by the second control node 104.

As illustrated by a step 110, a call via an internet protocol domain of the mobile network 100 and the packet switched access of the mobile network 100 is established for the terminal 108, and the terminal 108 is in an active mode. Alternatively, the call via the internet domain and the packet switched access may be currently being established for the terminal 108. The call may be adapted as an IMS voice call, an IMS video call or an IMS VoIP call.

In response to a receipt of a paging request from the first control node 102 for paging the terminal 108 via the packet switched access in a step 112, the second control node 104 starts a counter and a timer in the second control node 104 in a step 548. The timer runs for a time interval predetermined in the second control node 104. The counter counts a number of paging requests for paging the terminal 108 via the packet switched access, which paging requests are received by the second control node 104. The paging requests may be for the same or for a different circuit switched signaling service to be terminated to the terminal 108.

Thereupon steps 116, 118 explained with reference to FIG. 1 and indicated in FIG. 5 by a circle may be performed. It is assumed that both determinations are in the affirmative. Further, the second control node 104 may then determine in a subsequent step 550a whether a counted number of paging requests received by the second control node 104 may be equal or may exceed a predetermined number of paging requests within the preconfigured time interval. To this end, the second control node 104 may count the number of paging requests received for the terminal 108 so far since the timer has started and the second control node 104 may compare the counted number of paging requests with the predetermined number. The predetermined number may be preconfigured in the second control node 104 and may be equal to nine. Since only one paging request has been received since the performance of the step 548, the determination is not in the affirmative.

The second control node 104 then sends in a step 120a a paging rejection to the first control node 102 based on the result of the determinations in the steps 116, 118, 550a. In a case in which one or both of the determinations in the steps 116, 118 is not in the affirmative and/or the determination in the step 550*a* is in the affirmative, the second control node 104 may send a paging request to the terminal 108 as described in FIG. 1.

A further paging request may be received by the second control node 104 in a subsequent step 512*a*. Further, steps 516*a*, 518*b* which are similar to the steps 116, 118 and are indicated by a further circle may be performed by the second control node 104. Determinations in these steps 516*a*, 518*a* are assumed to be also in the affirmative in this embodiment. Thereupon a step 550*b* which is similar to the step 550*a* is performed. The determination of the latter step 550*b* is not in the affirmative. Thereupon, in a next step 520*a*, the second control node 104 sends in accordance with the result of the determinations in the steps 516*a*, 518*a*, 550*b* a paging rejection to the first control node 102. In a case in which one of the determinations in the steps 516*a*, 518*a* is not in the affirmative and/or the determination in the step 550*b* is in the affirmative, the second control node 104 may send a paging request to the terminal 108 as described in FIG. 1.

Further six paging requests for paging the terminal 108 are received by the second control node 104 from the first control node 102. These six paging requests are for a circuit switched signaling service which is different from the signaling service with which the paging requests received in the steps 112, 512*a* are associated. The steps 516*a*, 518*a*, 550*b* described above are performed for each paging request and each of these paging requests is accordingly rejected by a respective paging rejection message. The performed steps associated with the further six paging requests are omitted in FIG. 5 for ease of illustration.

In a next step 512*b*, an eights further paging request is received by the second control node 104 from the first control node 102. The paging request is for the same circuit switched signaling service as the paging request of the step 112 was for. After performing the steps 516*b*, 518*b* for the eights further paging request indicated in FIG. 5 by a circle and explained above, the second control node 104 performs a step 550*c* for the received further paging request and determines that the counted total number of received paging requests, i.e. nine, is equal to the threshold value of nine. In this respect, the predetermined number may represent the threshold value for the determination. The second control node 104 may then stop the timer before an expiration of the predetermined time interval and may also stop and optionally reset the counter to zero. The second control node 104 sends in a step 520*b* a paging request to the terminal 108 via the packet switched access irrespectively of a result of the determinations in the steps 516*b*, 518*b*. Accordingly, the result of the determination in the step 550*c* may overrule the result of the determination in the steps 516*b*, 518*b*. The sent paging request may be different from or may be the paging request received in the step 512*b* to the terminal 108, i.e. the received ninth paging request is forwarded to the terminal 108, as is explained with reference to the sent and forwarded paging request, respectively, described in FIG. 1. Further, as explained with reference to FIGS. 1 and 2, the respective paging request may comprise the identification of the circuit switched signaling service to be terminated and/or the core network domain indication. Hence, embodiments of the sent and forwarded paging request, respectively, described with reference to FIGS. 1 and 2 may also apply to the paging request of the step 520*b*.

In a case in which the determination in the step 550*c* might be not in the affirmative, the second control node 104 may send a further paging rejection to the first control 104.

The method may then stop. Alternatively, the method may proceed as described in FIGS. 2, 3 or FIG. 4 and the terminal 108 may accordingly perform the respective above explained steps. Here, the paging request 520*a* may correspond to the paging request sent in the step 220*a*. Thereupon the method may stop.

The paging request received in the step 112 may or may not be counted by the counter in the step 550*a*. The steps 116, 118, 516*a*, 516*b*, 518*a* and/or 518*b* can be omitted in the method. The steps 550*a*, 550*b*, 550*c* can be performed prior to the respective steps 116 and/or 118, 516*a* and/or 518*a*, and 516*b* and/or 518*b*, respectively.

Figure 6:
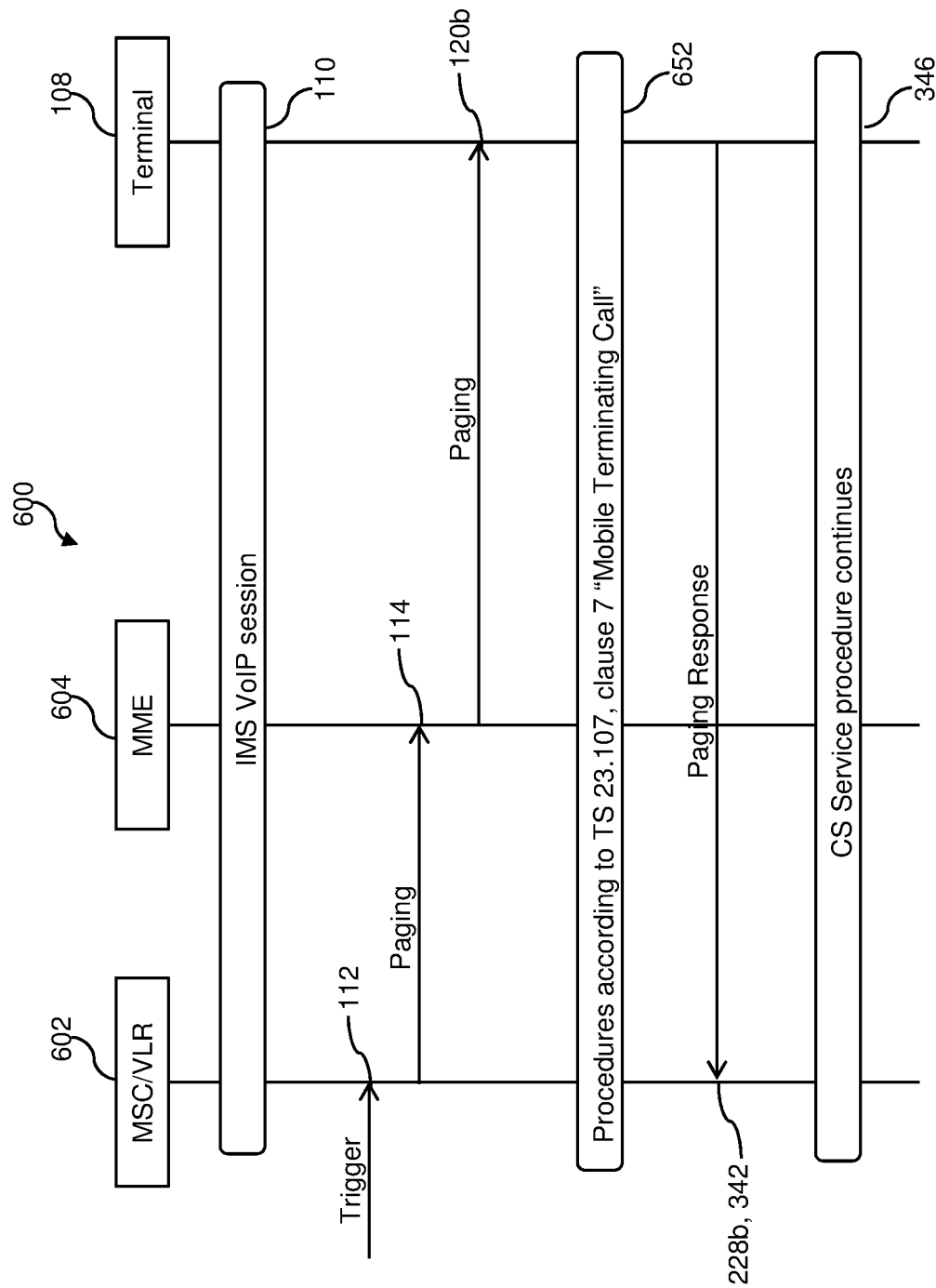
FIG. 6 is a flow diagram illustrating a method to be used in association with terminating a circuit switched signaling service to a terminal via a circuit switched access of a mobile network according to another embodiment.

Referring to FIG. 6, a method to be used in association with terminating a circuit switched signaling service to a terminal 108 via a circuit switched access of a mobile network 600 according to another embodiment will be explained. The mobile network 600 associated with the method comprises a first control node 602 configured as a MSC co-located with a Visitor Location Register (VLR) of a circuit switched domain of a core network of the mobile network 600, and a second control node 604 configured as a MME. The MME 604 is part of a packet switched domain of a or the core network, which domain is configured as Evolved Packet Core (EPC). An internet protocol domain of the mobile network 600 is configured as an IMS domain. The mobile network 600 further comprises a packet switched access configured, for example as a LTE network. A circuit switched access of the mobile network 600 can be UTRAN or GERAN. The method is performed by the MME 104 and/or the terminal 102. Further steps in FIG. 6 which are not performed by the latter entities are also labeled by a reference numeral for ease of explanation.

An IMS voice call, an IMS video call or an IMS VoIP call is established for the terminal 108 via the IMS domain and the LTE access, as indicated in a step 110. Alternatively, the call via the internet domain and the packet switched access may be currently being established for the terminal 108. For example, the MME 604 has an established S1 connection for the IMS VoIP session or IMS VoIP call. In the following, the embodiment will be explained with reference to the IMS voice call and IMS video call without loss of generality.

The MSC/VLR 602 receives in a step 112 a trigger for terminating a network initiated circuit switched signalling service to the terminal 108. The network initiated signalling service may be configured as Network (NW)-initiated signalling service defined for example in TS 23.271 V11.3.0 (2112-12), clause 8.4.2 or TS 23.271 V11.4.0 (2113-03), clause 8.4.2.

In a next step 114, the MSC/VLR 602 sends a paging request for paging the terminal 108 via the packet switched access by sending a paging message to the MME 604 over a SGs interface. The paging request may comprise an identification of the circuit switched signalling service. The identification may be embodied as a SS service ID. For a call independent supplementary service, the paging request message must include the SS service ID associated with the circuit switched signalling service to be terminated to the terminal 108. A SS service ID for USSD could be accordingly defined.

In a first variant of the method, the MME 604 may perform steps 116, 118 explained above. A corresponding termination indication is configured as "SMS only" indication indicating support of terminating only a circuit switched SMS service to the terminal 108 via the packet switched access. The bearer information is configured as information related to an availability or existence of a QCI=1 bearer, particularly for the terminal 108, in the MME 604. The bearer may run via the MME 604 to a node of the packet switched access, for example an eNodeB. A radio bearer may run from the node of the packet switched access to the terminal 108.

If the MME 604 did not send the termination indication to the terminal 108 by returning the "SMS-only" indication to the terminal 108 during previously performed Attach or Combined Tracking Area (TA)/Location Area (LA) Update procedures, and if there is no bearer information available in the MME 604 for the terminal 108, namely the information pertaining to the availability of a QCI=1 bearer, the MME 604 then sends in a further step 120b a paging request for paging the terminal 108 to the terminal 108. To this end, the MME 604 may forward the paging request message received in the step 114. The sent paging request message may comprise parameters as specified in TS 23.401 V12.0.0 (2013-03), for example a Core Network (CN) Domain Indicator. For a call independent supplementary service the paging request message may include the SS service ID. The SS service ID is used to indicate the type of the supplementary service, for example USSD, to the terminal 108. The SS service ID must be included in the sent circuit switched paging message, if the terminal 108 is in an active mode, for example the terminal 108 is currently communicating with a peer end.

An access node of the packet switched access, for example an eNodeB, may forward the paging request to the terminal 108. This access node may be the above mentioned access node at which the bearer from the core network may terminate and from which the radio bearer towards the terminal 108 may commence.

If the MME 604 returned the "SMS-only" indication to the terminal 108 during the Attach or Combined TA/LA Update procedures, or if there is the information about the QCI=1 bearer for the terminal 108 available in the MME 604, the MME 604 will not send the paging request message to the terminal 108, and the MME 604 sends a or the paging rejection for the circuit switched paging request towards the MSC 602 to stop the circuit switched paging procedure and this Circuit Switched Fallback (CSFB) procedure stops as explained in FIG. 1. The method then stops.

In a second variant of the method, the terminal 102 may perform the step 222 explained in FIG. 2 subsequent to a receipt of the paging request in the step 120b. The second variant may represent an alternative to the first variant. Hence, the determination in the step 222 pertaining to whether the terminal 108 is engaged in an IMS voice call or an IMS video call may be performed alternatively to the above described method flow comprising the determination of the step 118 pertaining to whether there is bearer information available in the MME 602 for the terminal 108. The first variant of the method can also be combined with the second variant of the method in that the paging request message sent by the MME 604 to terminal 108 may trigger the performance of the second variant of the method, for example in a case in which a default bearer is established via the MME 604 for the IMS voice call or IMS video call instead of the dedicated bearer with QCI=1.

If the terminal 108 is not engaged in an IMS voice or IMS video call, i.e. the terminal 108 is not in an active or alerting phase or mode, the mobile terminating call procedure then takes place in a step 652 as specified, for example, in clause 7 "Mobile Terminating Call Procedure" of TS 23.272 V11.4.0 (2013-03).

In the step 222, a first protocol IMS layer in the terminal 108 may need either to inform a lower protocol NAS layer in the terminal 108 that an IMS voice call or IMS video call is on-going or is currently to be established or the NAS layer in the terminal 108, when receiving the paging request message in the step 120b, may need to request the information from the IMS layer in the terminal 108 by querying the IMS layer in the terminal 108.

If the terminal 108 is engaged in an IMS voice call or IMS video call or the establishment thereof, the terminal 108 may then perform (the) steps 224 and/or 226, particularly explained with reference to FIG. 2, and may then decide to reject the paging request message with a call continuity indication explained above and configured as an error code of a first type. Accordingly, in a next step, the terminal 108 sends a paging rejection message including the error code of the first type to the MME 604 such that the MME 604 is informed and continues with a step 3 as described in clause 8.3.2.2 of TS 23.272 V11.4.0 (2013-03). Therefore SRVCC is initiated and the MSC 602 is informed to continue the applicable circuit switched procedure in a circuit switched access, for example GERAN or UTRAN. It is noted that the latter may imply that the same MSC 602 is used for SRVCC and for CSFB.

If the determination in the step 224 and/or 226 is not in the affirmative, for example if the terminal 108 does not want to perform SRVCC and/or to receive the NW-initiated circuit switched service, then the terminal 108 rejects the paging request message by sending, to the MME 604, a paging rejection including an error indication which is explained above and which is configured as an error code of a second type. Accordingly, the MME 604 does not continue with step 3 as described in clause 8.3.2.2 of TS 23.272 V11.4.0 (2013-03), and instead only informs the MSC 602 about the paging rejection by sending a respective paging rejection message.

In a third variant of the method, the terminal 108 may perform the step 230 and optionally the step 234 particularly explained above. The third variant may represent an alternative to both the first and second variant of the method or may follow the procedures of the first and/or second variant of the method. Steps of the third variant may also be part of the second variant, as explained with reference to FIG. 2. The paging request received by the terminal 108 may comprise a SS service ID.

Accordingly, if the terminal 108 receives a paging message with an SS service ID for which an IMS service is also available, for example support of terminating IMS USSD, and the terminal 108 has not registered yet for that IMS service, the terminal 108 may then perform an IMS registration using an or the associated registration request message comprising a support indication indicating support for this IMS service, as explained above particularly with reference to steps 230, 234 and 232. The mobile network 600 should then use the IMS service instead of the circuit switched service for termination.

The first variant of the method may be combined with the second and/or third variant of the method by the MME 604 employing a timer and a counter. Respective steps 548, 550a, 550b, 550c explained above may be performed by the MME 604 prior to sending a, for example forwarding the, further paging request to the terminal 108. A respective rule in the MME 604 associated with the timer and the counter may specify the following: If within a predetermined time interval a predetermined number of terminating NW-initiated circuit switched signalling service requests is counted by the counter, the paging request is then sent to the terminal 108 and the second and/or third variant of the method continues. The predetermined number of the terminating NW-initiated circuit switched service requests may be compared to the counted number of paging requests in the steps 550*a*, 550*b*, 550*c*.

The terminal 102 may also send a paging response message to the MME 604 in a step 228*b* which in turn sends a paging response to the MSC 602 in a step 342 in a case in which the determination of the terminal 108 in the step 222 is not in the affirmative, hence the terminal 108 is not engaged in an IMS voice call or IMS video call.

Once the paging response is successfully returned to the MSC 602 in the step 342, the applicable circuit switched procedures continues, particularly in the step 346, for example for a supplementary service as specified in specifications such as TS 23.090 V11.0.0 (2012-09).

Figure 7:
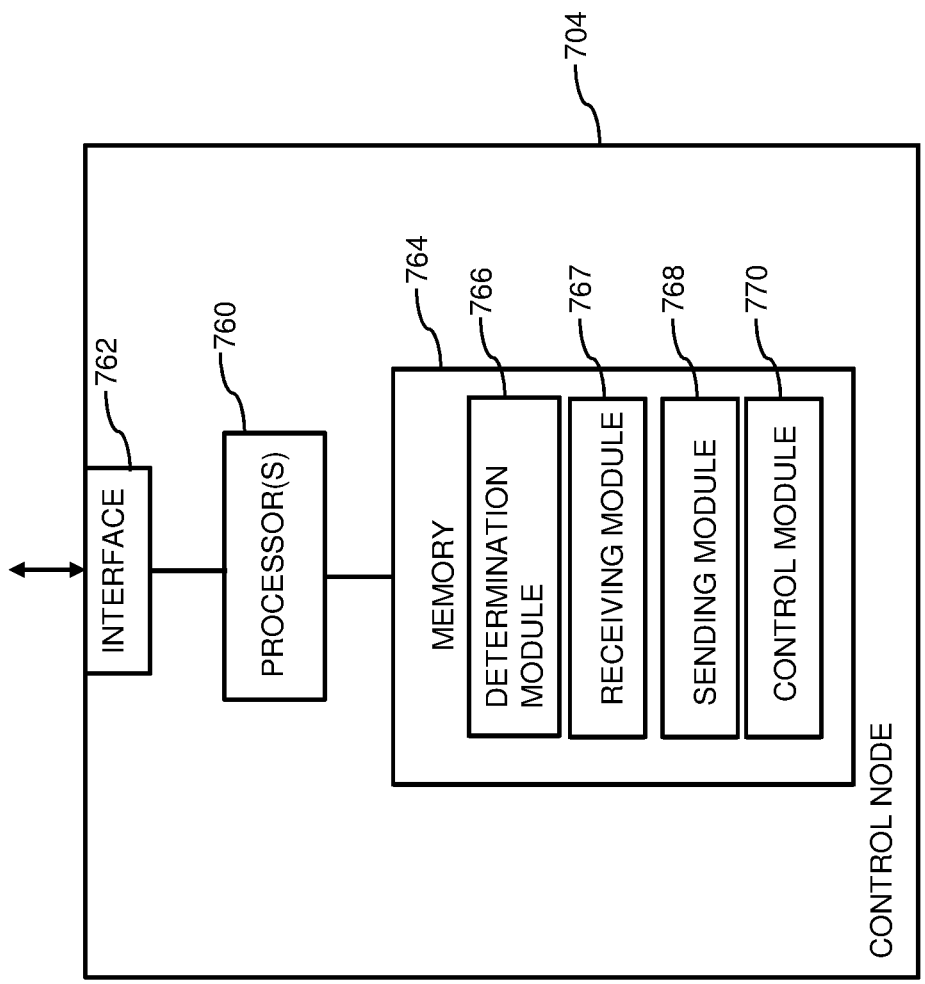
FIG. 7 is a block diagram illustrating a control node for a mobile network according to an embodiment.

Referring to FIG. 7, a control node 704 for a mobile network according to an embodiment will be described. The control node 704 can be the control node 104 or the control node 604 and can be the MME described in the following FIGS. 10 and 11. The control node 704 is usable in association with terminating a circuit switched signaling service to a terminal via a circuit switched access of a mobile network. The signaling service is different from a voice call via the circuit switched access and from a mobile terminating location request service. A call via an internet protocol domain of the mobile network and a packet switched access of the mobile network is or is being established for the terminal. The control node 704 is adapted to receive a paging request for paging the terminal via the packet switched access, the paging request being for the circuit switched signaling service. The control node 704 is further adapted to determine whether a call via the internet protocol domain and the packet switched access is or is being established for the terminal depending on the received paging request, and to send a paging rejection for rejecting the received paging request depending on the call via the internet protocol domain and the packet switched access is or is being established for the terminal and to send, via the packet switched access, a paging request for paging the terminal depending on the call via the internet protocol domain and the packet switched access is not or is being not established for the terminal. The control node 704 can be adapted to perform the method described above and/or below.

The control node 704 may comprise one or more processors 760 adapted to perform the above functionalities of the control node 704. The control node 704 may further comprise an interface 762 to which the one or more processors 760 are coupled and via which the paging request can be received and/or via which the paging rejection, the paging request and/or the paging response described above can be sent. The control node 704 may further comprise a memory 764 coupled to the one or more processors 760. The memory 764 may include a ROM, for example, a flash ROM, a RAM, e.g., a DRAM or SRAM, a mass storage, for example, a hard disk or solid state disk, or the like. The memory 764 may include suitably configured program code, particularly embodied as one or more modules, to be executed by the one or more processors 760 so as to implement the above-described functionalities of the control node 704. In particular, the memory 764 may comprise a determination module 766 implementing the above described determination functionalities of the control node 704. The determination module 766 may also implement the functionality of the control node 704 relating to the receiving of a paging request. Alternatively or additionally, the memory 764 may comprise a receiving module 767 implementing the latter described receiving functionality. The determination module 766 may also implement the functionality of the control node 704 relating to the sending of a paging rejection, a paging request and/or a paging response. Alternatively or additionally, the memory 764 may comprise a sending module 768 implementing the latter described sending functionality. Further, the memory 764 may also comprise a control module 770 for implementing various control functionalities of the control node 704, for example for controlling the payload and signaling transmission via the packet switched access.

It is to be understood that the structures as illustrated in FIG. 7 are merely schematic and that the control node 704 may actually include further components which, for the sake of clarity, have not been illustrated, for example, further interfaces or processors. Also, it is to be understood that the memory 764 may include further types of program code modules, which have not been illustrated, for example, program code modules for implementing known functionalities of a MME. According to some embodiments, a computer program may be provided. The computer program may be embodied as or may comprise the above program code. The computer program may be executable by the one or more processors 760 of the control node 704. The execution of the computer program by the one or more processors 760 may cause the control node 704 to perform a method described above and/or below. According to some embodiments, also a computer program product may be provided for implementing functionalities of the control node 704, for example, in the form of a medium storing the program code and/or other data to be stored in the memory 764.

Figure 8:
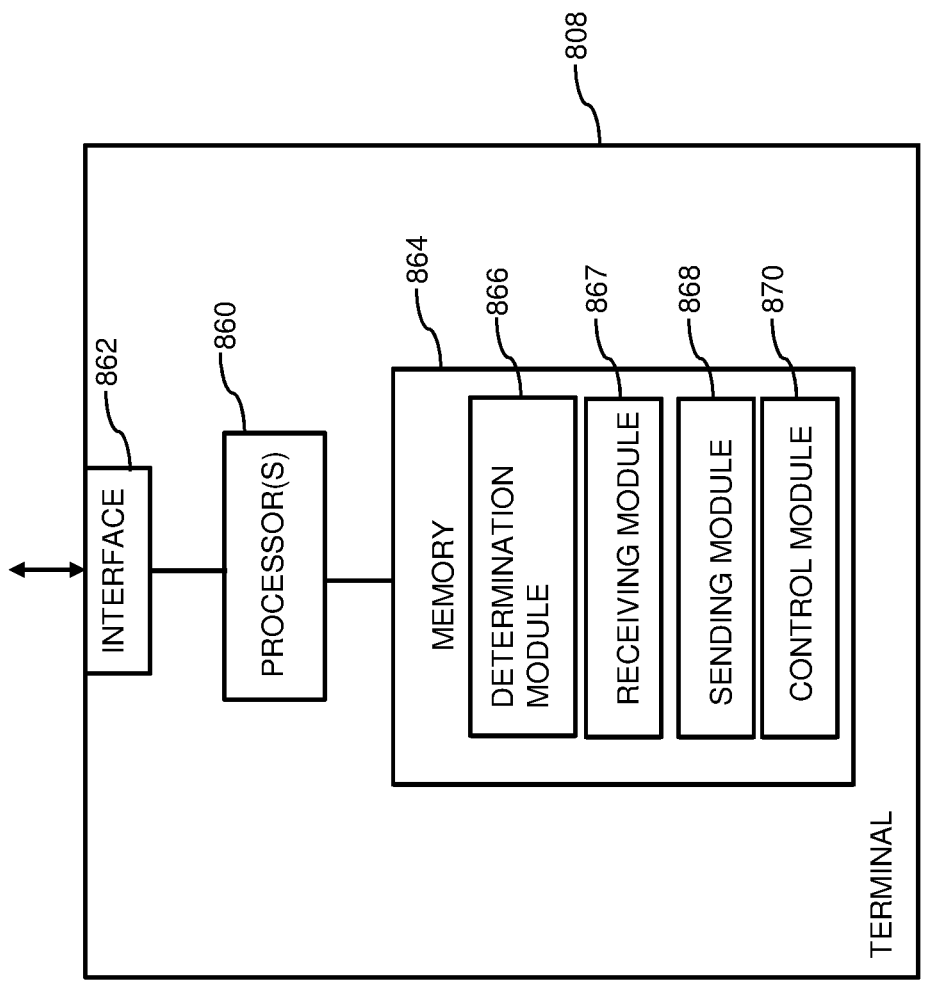
FIG. 8 is a block diagram illustrating a terminal to be usable in association with terminating a circuit switched signaling service to the terminal via a circuit switched access of a mobile network according to an embodiment.

Referring to FIG. 8, a terminal 808 to be usable in association with terminating a circuit switched signaling service to the terminal 808 via a circuit switched access of a mobile network according to an embodiment will be described. The terminal 808 may be embodied as the terminal 108 described above or as the terminal described in the following FIGS. 10 and 11. The signaling service is different from a voice call via the circuit switched access and from a mobile terminating location request service. A call via an internet protocol domain of the mobile network and a packet switched access of the mobile network is or is being established for the terminal 808. The terminal 808 is adapted to receive, via the packet switched access, a paging request for paging the terminal 808. The paging request is for the circuit switched signaling service. The terminal 808 is further adapted to determine whether a call via the internet protocol domain and the packet switched access is or is being established for the terminal 808 depending on the received paging request, and to send, via the packet switched access, a paging rejection for rejecting the paging request by the terminal 808 depending on the call via the internet protocol domain and the packet switched access is or is being established for the terminal 108 and to send a paging response for accepting the paging request by the terminal 108 depending on the call via the internet protocol domain and the packet switched access is not or is being not established for the terminal 808. The terminal 808 may be adapted to perform the method as described above and/or below.

The terminal 808 may comprise one or more processors 860 adapted to perform the above functionalities of the terminal 808. The terminal 808 may further comprise an interface 862 to which the one or more processors 860 are coupled and via which the paging request can be received and/or via which the paging rejection, the paging response, the support indication and/or the registration request described above can be sent. The terminal 808 may further comprise a memory 864 coupled to the one or more processors 860. The memory 864 may include a ROM, for example, a flash ROM, a RAM, e.g., a DRAM or SRAM, a mass storage, for example, a hard disk or solid state disk, or the like. The memory 864 may include suitably configured program code, particularly embodied as one or more modules, to be executed by the one or more processors 860 so as to implement the above-described functionalities of the terminal 808. In particular, the memory 864 may comprise a determination module 866 implementing the above described determination functionalities of the terminal 808. The determination module 866 may also implement the functionality of the terminal 808 relating to the receiving of a paging request. Alternatively or additionally, the memory 864 may comprise a receiving module 867 implementing the latter described receiving functionality. The determination module 866 may also implement the functionality of the terminal 808 relating to the sending of a paging rejection in which the call continuity indication or the error indication may be included, a paging response, a support indication and/or the registration request. Alternatively or additionally, the memory 864 may comprise a sending module 868 implementing the latter described sending functionality. Further, the memory 864 may also comprise a control module 870 for implementing various control functionalities of the terminal 808, for example for controlling operations related to sending feedback messages or receiving control messages via the interface 862.

Figure 9:
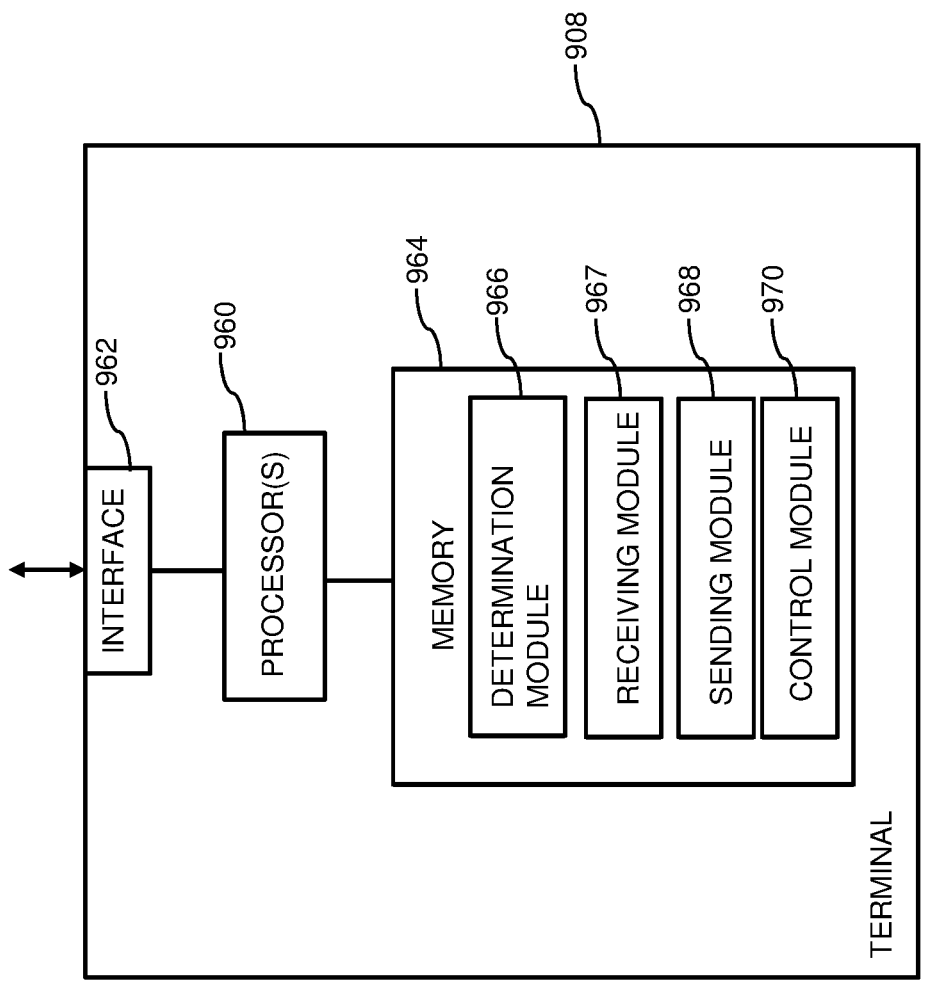
FIG. 9 is a block diagram illustrating a terminal to be usable in association with terminating a circuit switched signaling service to the terminal via a circuit switched access of a mobile network according to another embodiment.

Referring to FIG. 9, a terminal 908 to be usable in association with terminating a circuit switched signaling service to the terminal 908 via a circuit switched access of a mobile network according to another embodiment is described. The terminal 908 may be embodied as the terminal 108 described above or as the terminal described in the following FIGS. 10 and 11. The signaling service is different from a voice call via the circuit switched access and from a mobile terminating location request service. A call via an internet protocol domain of the mobile network and a packet switched access of the mobile network is or is being established for the terminal 908. The terminal 908 is adapted to receive a paging request for paging the terminal 908 via the packet switched access. The paging request is for the circuit switched signaling service. The terminal 908 is adapted to determine whether a signaling service via the internet protocol domain is available for the terminal 908 depending on the received paging request. The signaling service via the internet protocol domain corresponds to the circuit switched signaling service. The terminal 908 is further adapted to send, via the packet switched access, a support indication indicating a terminal support of or for the signaling service via the internet protocol domain depending on the signaling service via the internet protocol domain being available for the terminal 908. The terminal 908 may be also adapted to perform a method as described above and/or below.

The terminal 908 may comprise one or more processors 960 adapted to perform the above functionalities of the terminal 908. The terminal 908 may further comprise an interface 962 to which the one or more processors 960 are coupled and via which the paging request can be received and/or via which the support indication, a paging rejection, a paging response and/or a registration request described above can be sent. The terminal 908 may further comprise a memory 964 coupled to the one or more processors 960. The memory 964 may include a ROM, for example, a flash ROM, a RAM, e.g., a DRAM or SRAM, a mass storage, for example, a hard disk or solid state disk, or the like. The memory 964 may include suitably configured program code, particularly embodied as one or more modules, to be executed by the one or more processors 960 so as to implement the above-described functionalities of the terminal 908. In particular, the memory 964 may comprise a determination module 966 implementing the above described determination functionalities of the terminal 908. The determination module 866 may also implement the functionality of the terminal 908 relating to the receiving of a paging request. Alternatively or additionally, the memory 964 may comprise a receiving module 967 implementing the latter described receiving functionality. The determination module 966 may also implement the functionality of the terminal 908 relating to the sending of the support indication alone or together with a registration request, a paging rejection in which the call continuity indication or the error indication may be included and a paging response. Alternatively or additionally, the memory 964 may comprise a sending module 968 implementing the latter described sending functionality. Further, the memory 964 may also comprise a control module 970 for implementing various control functionalities of the terminal 908, for example for controlling operations related to sending feedback messages or receiving control messages via the interface 962.

It is to be understood that the structures as illustrated in FIGS. 8, 9 are merely schematic and that the terminal 808, 908 may actually include further components which, for the sake of clarity, have not been illustrated, for example, further interfaces or processors. Also, it is to be understood that the memory 864, 964 may include further types of program code modules, which have not been illustrated, for example, program code modules for implementing known functionalities of a terminal. According to some embodiments, a computer program may be provided. The computer program may be embodied as or may comprise the above program code. The computer program may be executable by the one or more processors 860, 960. The execution of the computer program by the one or more processors 860, 960 may cause the terminal 808, 908 to perform a method described above and/or below. According to some embodiments, also a computer program product may be provided for implementing functionalities of the terminal 808, 908, for example, in the form of a medium storing the program code and/or other data to be stored in the memory 894, 964.

In the following, a communication system according to an embodiment will be described. The communication system comprises at least one of the control node 104, 604, 704 described above with reference to FIGS. 1 to 7 and/or below with reference to FIGS. 10, 11, and a terminal 108, 808, 908 described above with reference to FIGS. 1 to 6 and 8, 9 and/or below with reference to FIGS. 10, 11.

Figure 10:
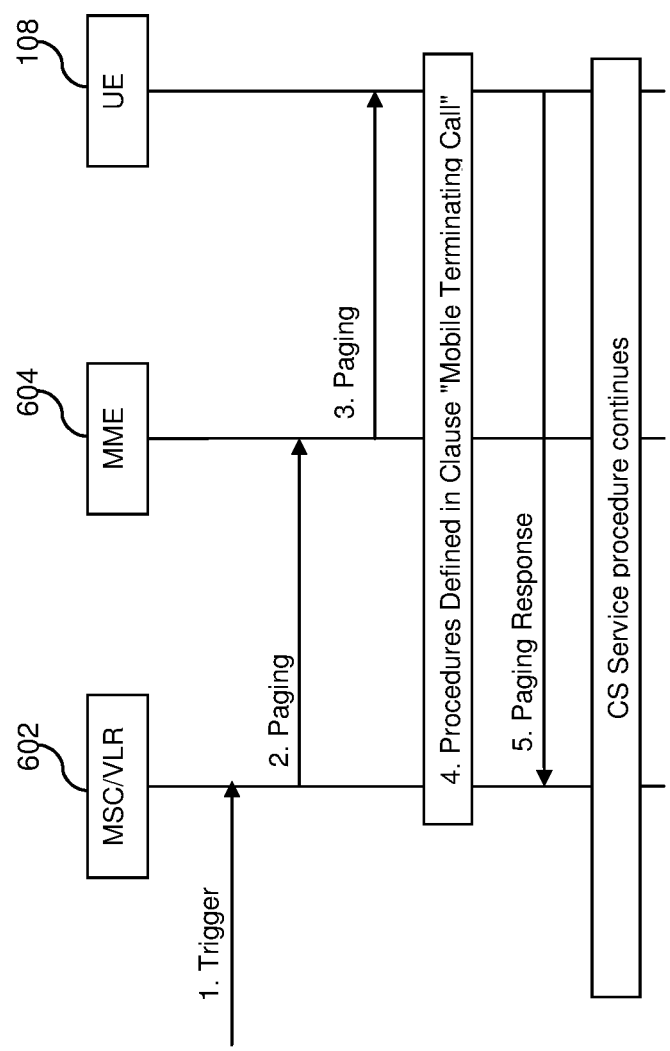
FIG. 10 is a flow diagram illustrating a method to be used in association with terminating a circuit switched signaling service to a terminal via a circuit switched access of a mobile network according to another embodiment.

Referring to FIG. 10, methods, nodes, a terminal, a communication system and computer programs to be usable in association with terminating a circuit switched signaling service to the terminal via a circuit switched access of a mobile network according to another embodiment will be described. The terminal may be referred to the following as user equipment UE and may be labeled in FIG. 10 by a reference numeral 108 for ease of explanation. The abbreviation CS stands for circuit switched. The first control node 102, 602 described above may correspond in the following to the MSC. For ease of explanation, the MSC may be labeled in FIG. 10 by a reference numeral 602. The second control node 104, 604, 704 described above may correspond in the following to the MME. For ease of explanation, the MME may be labeled in FIG. 10 by a reference numeral 604. The access node 106 described above may correspond in the following to the eNodeB.

A basic concept of the embodiment is as follows: Correcting the handling of NW-initiated CS service such that either in a first alternative called (Alt 1) the network does not page the UE or in a second alternative called (Alt 2) the UE can reject the paging in case of an ongoing IMS voice call and that the UE can decide whether SRVCC should be applied or not. The embodiment may enable that during network-initiated CS services like USSD, when an IMS call is ongoing, the IMS call is not interrupted.

The embodiment may relate to a handling of terminating CS services during IMS Call. Currently it is specified in 3GPP TS 23.272 V11.4.0 (2013-03) that the UE performs CS fallback in case of a NW-initiated CS service other than voice or LR, even if there is an IMS voice call ongoing. Only for MT-LR the handling in case of an ongoing IMS voice call is described. However, this may cause an interruption of an IMS voice call in case of a NW-initiated CS services and this is not wanted. Therefore, as mentioned above, correcting the handling of NW-initiated CS service is performed such that either (Alt 1) the network does not page the UE or (Alt 2) the UE can reject the paging in case of an ongoing IMS voice call and that the UE can decide whether SRVCC should be applied or not. Therefore the IMS call may be terminated during network-initated CS service like USSD.

A NW-Initiated CS Services procedure will be described in the following.

In a step 1, MSC/VLR receives a trigger for a NW-Initiated CS procedure.

In a step 2, MSC/VLR sends Paging message to MME. For call independent supplementary service, the Paging message must include the SS service ID.

In a step 3, if the MME did not return the "SMS-only" indication to the UE during Attach or Combined TA/LA Update procedures, and (Alt 1) if there is no QCI=1 bearer for the UE, then the MME sends Paging (parameters as specified in TS 23.401 [2], CN Domain Indicator) message to UE. For call independent supplementary service the Paging message may include the SS service ID. SS service ID is used to indicate the type of the supplementary service (e.g. USSD) to the UE. The SS service ID must be included in CS Page if UE is in active mode.

If the MME returned the "SMS-only" indication to the UE during Attach or Combined TA/LA Update procedures, or if there is a QCI=1 bearer for the UE, the MME shall not send the Paging to the UE, and the MME sends CS Paging Reject towards MSC to stop CS Paging procedure and this CSFB procedure stops.

In a step 4, (Alt 2) if the UE is not engaged in an IMS voice (or video) call (active or alerting phase), then the mobile terminating call procedure then takes place as specified in clause 7 "Mobile Terminating Call Procedure" of TS 23.272 V11.4.0 (2013-03). The IMS layer in the UE needs either to inform the NAS layer in the UE that an IMS voice (or video) call is ongoing or the NAS layer, when receiving the paging, needs to query the IMS layer.

If the UE is engaged in an IMS voice (or video) call, and then the UE may decide to reject the paging with an appropriate error code such that the MME is informed and continues with step 3 as described in clause 8.3.2.2 of TS 23.272 V11.4.0 (2013-03), i.e., SRVCC is initiated and the MSC is informed to continue the applicable CS procedure in GERAN/UTRAN.

It is noted that this implies that the same MSC is used for SRVCC and for CSFB.

If the UE does not want to perform SRVCC to receive the NW-initiated CS service, then the UE rejects the paging with an appropriate error code such that the MME does not continue with step 3 as described in clause 8.3.2.2 of TS 23.272 V11.4.0 (2013-03) and instead only informs the MSC about the paging error or rejection.

If receiving a paging with an SS service ID for which an IMS service is also available (e.g. support of terminating IMS USSD), and the UE hasn't registered yet for that service, then the UE may perform IMS registration indicating support for this IMS service. The network should then use the IMS service instead of the CS service for termination.

It is noted that (Alt 1) and (Alt 2) can be combined by adding a timer and a counter to Alt 1—if within a defined time the defined numbers of terminating NW-initiated CS service requests is counted, then paging is send to the UE and Alt 2 is initiated.

In a step 5, once the paging is successfully returned to MSC, the applicable CS procedures continues, e.g. for Supplementary Service as specified in specifications such as TS 23.090 mentioned above.

Figure 11:
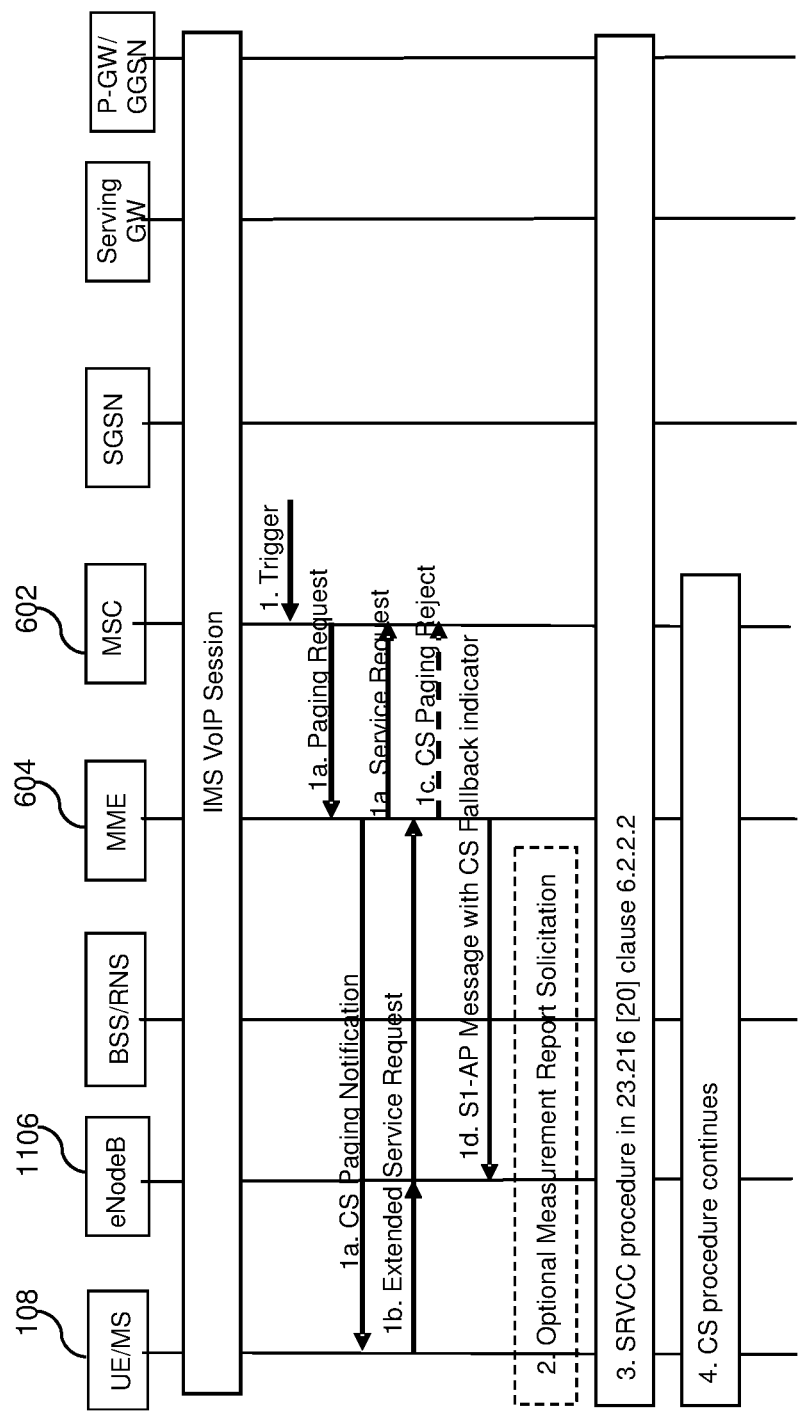
FIG. 11 is a flow diagram illustrating a method to be used in association with terminating a circuit switched signaling service to a terminal via a circuit switched access of a mobile network according to another embodiment.

Referring to FIG. 11, methods, nodes, a terminal, a communication system and computer programs to be usable in association with terminating a circuit switched signaling service to the terminal via a circuit switched access of a mobile network according to another embodiment will be described. The terminal may be referred to the following as user equipment UE and may be labeled in FIG. 11 by a reference numeral 108 for ease of explanation. The abbreviation CS stands for circuit switched. The first control node 102, 602 described above may correspond in the following to the MSC. For ease of explanation, the MSC may be labeled in FIG. 11 by a reference numeral 602. The second control node 104, 604, 704 described above may correspond in the following to the MME. For ease of explanation, the MME MSC may be labeled in FIG. 11 by a reference numeral 602. The access node 106 described above may correspond in the following to the eNodeB. For ease of explanation, the eNodeB may be labeled in FIG. 11 by a reference numeral 1106.

The embodiment relates to handling of terminating CS services during IMS Call. Currently it is specified in TS 23.272 V11.4.0 (2013-03) that the UE performs CS fallback in case of a NW-initiated CS service other than voice, even if there is an IMS voice call ongoing. Only for MT-LR the handling in case of an ongoing IMS voice call is described (and SRVCC is initiated in this case). However, performing CS fallback in case an IMS voice call is ongoing without initiating SRVCC will cause an interruption of this IMS voice call and this is not wanted. Accordingly, the embodiment suggests correcting the handling of NW-initated CS service such that the UE can reject the paging in case of an ongoing IMS voice call and that the UE can decide whether SRVCC should be applied or not. Therefore, the IMS call is terminated during network-initated CS service like USSD.

NW-Initiated CS Service procedures if UE is in IMS VoIP session will be described in the following.

In a step 1, MSC/VLR receives a trigger for a NW-Initiated CS procedure.

In a step 1a., the MSC responds by sending a Paging Request to the MME over a SGs interface. For call independent supplementary service, the Paging message may include the SS service ID. The MME has an established S1 connection for IMS VoIP session.

If the MME did not return the "SMS-only" indication to the UE during Attach or Combined TA/LA Update procedures, the MME sends Paging (parameters as specified in TS 23.401 mentioned above, CN Domain Indicator) message to UE. For call independent supplementary service the Paging message may include the SS service ID. SS service ID is used to indicate the type of the supplementary service to the UE. The SS service ID is only included in CS Page if UE is in active mode.

If the MME returned the "SMS-only" indication to the UE during Attach or Combined TA/LA Update procedures, the MME shall not send the Paging to the UE, and the MME sends CS Paging Reject towards MSC to stop CS Paging procedure and this CSFB procedure stops.

The eNodeB forwards the paging message to the UE.

In a step 1b., UE sends an Extended Service Request (Reject or Accept) message to the MME for mobile terminating CS Fallback. The Extended Service Request message is encapsulated in RRC and S1-AP messages.

In a step 1c., upon receiving the Extended Service Request (Reject) for mobile terminating CS Fallback, the MME sends Paging Reject towards MSC to stop CS Paging procedure and this CSFB procedure stops. Corresponding error handling is returned to the GMLC as specified in TS 23.271 V11.2.0 (2013-03).

In a step 1d., MME sends an S1-AP Request message to eNodeB that includes the UE Radio Capabilities and a CS Fallback Indicator. This message indicates to the eNodeB that the UE should be moved to UTRAN/GERAN.

In a step 1e., the eNodeB shall reply with S1-AP Response message.

In a step 2, these steps are performed as defined in clause 7.3 of TS 23.272 V11.4.0 (2013-03) for PS handover supported case and clause 7.4 TS 23.272 V11.4.0 (2013-03) for No PS handover supported case.

In a step 3, based on UE measurement reports and CS Fallback Indicator in step 1d, the source E UTRAN decides to trigger an SRVCC handover to UTRAN/GERAN. Continuous SRVCC procedures as specified in TS 23.216 V11.0.0 (2012-09), clause 6.2.2.2 for PS handover supported case and clause 6.2.2.1a for No PS HO supported case are performed.

In a step 4, after receiving Relocation/Handover Complete message from the RNS/BSS in step 3, the applicable CS procedures continues, e.g. for Supplementary Service as specified in specifications such as TS 23.090 mentioned above.

It is noted that when SRVCC capable UE is in active mode with an IMS VoIP session but the network does not support SRVCC, MME sends Paging Reject towards MSC and this CSFB procedure stops. This is based on the bearer information at MME indicating UE has IMS VoIP session, i.e. EPS bearer with QCI=1.

In the following, further embodiments will be described.

In an embodiment 1, a method to be used in association with terminating a circuit switched signaling service to a terminal 108, 808, 908 via a circuit switched access of a mobile network 100, 600 is provided, the signaling service being different from a voice call via the circuit switched access and from a mobile terminating location request service, a call via an internet protocol domain of the mobile network 100, 600 and a packet switched access of the mobile network 100, 600 being established for the terminal 108, 808, 908, the method being performed by a control node 104, 604, 704 of the mobile network 100, 600 and comprising: receiving 112, 512a, 512b a paging request for paging the terminal 108, 808, 908 via the packet switched access, the paging request being for the circuit switched signaling service, determining 118, 518a, 518b whether a call via the internet protocol domain and the packet switched access is established for the terminal 108, 808, 908 depending on the received paging request, and sending 120a, 520a a paging rejection for rejecting the received paging request depending on the call via the internet protocol domain and the packet switched access being established for the terminal 108, 808, 908 and sending 120b, 220b, 520b, via the packet switched access, a paging request for paging the terminal 108, 808, 908 depending on the call via the internet protocol domain and the packet switched access being not established for the terminal 108, 808, 908.

In an embodiment 2, the method according to embodiment 1 is provided, wherein the step 118, 518a, 518b of determining comprises: determining whether bearer information is available in the control node 104, 604, 704, the bearer information indicating a call via the internet protocol domain and the packet switched access being established for the terminal 108, 808, 908, wherein the step 120a, 520a of sending the paging rejection is performed depending on the bearer information being available in the control node 104, 604, 704, wherein the step 120b, 220b, 520b of sending the paging request is performed depending on the control node 104, 604, 704 being free of the bearer information.

In an embodiment 3, the method according to embodiment 1 or 2 is provided, the method further comprising: determining 116, 516a, 516b whether the control node 104, 604, 704 has sent a fallback indication to the terminal 108, 808, 908, the fallback indication indicating a terminal support of a circuit switched fall back procedure for a circuit switched short messaging service, wherein the step 120a, 520a of sending the paging rejection is performed depending on the control node 104, 604, 704 having sent the fallback indication, wherein the step 120b, 220b, 520b of sending the paging request via the packet switched access is performed depending on the control node 104, 604, 704 having not sent the fallback indication.

In particular, the fallback indication may be embodied as the "SMS only" indication explained above.

In an embodiment 4, the method according to any one of embodiments 1 to 3 is provided, the method further comprising: starting 548 a timer and a counter in the control node 104, 604, 704 in response to the received paging request, the timer running for a predetermined time interval, the counter counting a number of paging requests received by the control node 104, 604, 704, receiving 512a, 512b at least a further paging request for paging the terminal 108, 808, 908 via the packet switched access, and sending 520b, via the packet switched access, a further paging request depending on a counted number of received paging requests being equal to or exceeding a predetermined number of paging requests within the predetermined time interval.

In an embodiment 5, the method according to any one of embodiment 1 to 4 is provided, wherein at least one of the received paging request, the received at least further paging request, the sent paging request and the sent further paging request comprises an identification of the circuit switched signaling service, particularly a SS service ID.

In an embodiment 6, a method to be used in association with terminating a circuit switched signaling service to a terminal 108, 808, 908 via a circuit switched access of a mobile network 100, 600 is provided, the signaling service being different from a voice call via the circuit switched access and from a mobile terminating location request service, a call via an internet protocol domain of the mobile network 100, 600 and a packet switched access of the mobile network 100, 600 being established for the terminal 108, 808, 908, the method being performed by the terminal 108, 808, 908 and comprising: receiving 120b, 220b, 520b, via the packet switched access, a paging request for paging the terminal 108, 808, 908, the paging request being for the circuit switched signaling service, determining 222 whether a call via the internet protocol domain and the packet switched access is established for the terminal 108, 808, 908 depending on the received paging request, and sending 228*a*, via the packet switched access, a paging error for indicating an unsuccessful handling of the paging request by the terminal 108, 808, 908 depending on the call via the internet protocol domain and the packet switched access being established for the terminal 108, 808, 908 and sending 228*b* a paging response for indicating a successful handling of the paging request by the terminal 108, 808, 908 depending on the call via the internet protocol domain and the packet switched access being not established for the terminal 108, 808, 908.

In an embodiment 7, the method according to embodiment 6 is provided, wherein the step 222 of determining comprises using information provided from a first protocol layer in the terminal 108, 808, 908, particularly an Internet Protocol Multimedia Subsystem layer, to a lower second protocol layer in the terminal 108, 808, 908, particularly a Non Access Stratum layer.

In an embodiment 8, the method according to embodiment 7 is provided, wherein the information is provided from the first protocol layer upon request from the lower second protocol layer.

In an embodiment 9, the method according to any one of embodiments 6 to 8 is provided, the method further comprising at least one of: determining 224 whether the terminal 108, 808, 908 will receive the circuit switched signaling service, and determining 226 whether the terminal 108, 808, 908 will perform a call continuity procedure for the established call from the packet switched access to the circuit switched access, wherein the step 228*a* of sending the paging error is performed depending on the terminal 108, 808, 908 will receive the circuit switched signaling service and/or depending on the terminal 108, 808, 908 will perform the call continuity procedure, particularly an error code of a first type.

In an embodiment 10, the method according to any one of embodiments 6 to 9 is provided, wherein the paging error comprises a call continuity indication indicating to initiate, for the established call of the terminal (108, 808, 908), a call continuity procedure from the packet switched access to the circuit switched access.

In an embodiment 11, the method according to embodiment 9 or 10 is provided, the method further comprising: performing 340 the call continuity procedure for the established call of the terminal 108, 808, 908 subsequent to an access node 106 of the mobile network 100, 600 requesting to perform the call continuity procedure.

In an embodiment 12, the method according to any one of embodiments 6 to 11 is provided, wherein the step 228*a* of sending the paging error is performed depending on the terminal 108, 808, 908 will not receive the circuit switched signaling service and/or depending on the terminal 108, 808, 908 will not perform the call continuity procedure, and/or wherein the sent paging error comprises an error indication indicating the unsuccessful handling of the paging request by the terminal 108, 808, 908, particularly an error code of a second type.

In an embodiment 13, the method according to any one of embodiments 6 to 12 is provided, the method further comprising: determining 230 whether a signaling service via the internet protocol domain is available for the terminal 108, 808, 908, the signaling service via the internet protocol domain corresponding to the circuit switched signaling service to be terminated, and sending 232, via the packet switched access, a support indication indicating a terminal support of the signaling service via the internet protocol domain depending on the signaling service via the internet protocol domain being available for the terminal 108, 808, 908.

In an embodiment 14, the method according to embodiment 13 is provided, the method further comprising: determining 234 whether the terminal 108, 808, 908 is registered in the signaling service via the internet protocol domain, wherein the support indication is sent together with a registration request for registering in the signaling service via the internet protocol domain depending on the terminal 108, 808, 908 being not registered in the signaling service via the internet protocol domain, wherein the support indication is sent without the registration request for registering in the signaling service via the internet protocol domain depending on the terminal 108, 808, 908 being registered in the signaling service via the internet protocol domain.

In an embodiment 15, a method to be used in association with terminating a circuit switched signaling service to a terminal 108, 808, 908 via a circuit switched access of a mobile network 100, 600 is provided, the signaling service being different from a voice call via the circuit switched access and from a mobile terminating location request service, a call via an internet protocol domain of the mobile network 100, 600 and a packet switched access of the mobile network 100, 600 being established for the terminal 108, 808, 908, the method being performed by the terminal 108, 808, 908 and comprising: receiving 120*b*, 220*b* a paging request for paging the terminal 108, 808, 908 via the packet switched access, the paging request being for the circuit switched signaling service, determining 230 whether a signaling service via the internet protocol domain is available for the terminal 108, 808, 908 depending on the received paging request, the signaling service via the internet protocol domain corresponding to the circuit switched signaling service, and sending 232, via the packet switched access, a support indication indicating a terminal support of the signaling service via the internet protocol domain depending on the signaling service via the internet protocol domain being available for the terminal 108, 808, 908.

In an embodiment 16, the method according to embodiment 15 is provided, the method further comprising: sending 228*a*, via the packet switched access, a paging error for indicating an unsuccessful handling of the paging request by the terminal 108, 808, 908 depending on the received paging request.

In an embodiment 17, the method according to embodiment 15 or 16 is provided, the method further comprising: determining 222 whether a call via the internet protocol domain and the packet switched access is established for the terminal 108, 808, 908 depending on the received paging request, wherein the step 229*a* of sending the paging error is performed depending on the call via the internet protocol domain and the packet switched access being established for the terminal 108, 808, 908.

In an embodiment 18, a control node 104, 604, 704 for a mobile network 100, 600 is provided, the control node 104, 604, 704 being usable in association with terminating a circuit switched signaling service to a terminal 108, 808, 908 via a circuit switched access of a mobile network 100, 600, the signaling service being different from a voice call via the circuit switched access and from a mobile terminating location request service, a call via an internet protocol domain of the mobile network 100, 600 and a packet switched access of the mobile network 100, 600 being established for the terminal 108, 808, 908, the control node 104, 604, 704 being adapted to: receive a paging request for paging the terminal 108, 808, 908 via the packet switched access, the paging request being for the circuit switched signaling service, determine whether a call via the internet protocol domain and the packet switched access is established for the terminal 108, 808, 908 depending on the received paging request, and send a paging rejection for rejecting the received paging request depending on the call via the internet protocol domain and the packet switched access being established for the terminal 108, 808, 908 and send, via the packet switched access, a paging request for paging the terminal 108, 808, 908 depending on the call via the internet protocol domain and the packet switched access being not established for the terminal 108, 808, 908.

In an embodiment 19, the control node according to embodiment 18 is provided, adapted to perform the method according to any one of embodiments 2 to 5.

In an embodiment 20, a terminal 108, 808, 908 to be usable in association with terminating a circuit switched signaling service to the terminal 108, 808, 908 via a circuit switched access of a mobile network 100, 600 is provided, the signaling service being different from a voice call via the circuit switched access and from a mobile terminating location request service, a call via an internet protocol domain of the mobile network 100, 600 and a packet switched access of the mobile network 100, 600 being established for the terminal 108, 808, 908, the terminal 108, 808, 908 being adapted to: receive, via the packet switched access, a paging request for paging the terminal 108, 808, 908, the paging request being for the circuit switched signaling service, determine whether a call via the internet protocol domain and the packet switched access is established for the terminal 108, 808, 908 depending on the received paging request, and send, via the packet switched access, a paging error for indicating an unsuccessful handling of the paging request by the terminal 108, 808, 908 depending on the call via the internet protocol domain and the packet switched access being established for the terminal 108, 808, 908 and send a paging response for indicating a successful handling of the paging request by the terminal 108, 808, 908 depending on the call via the internet protocol domain and the packet switched access being not established for the terminal 108, 808, 908.

In an embodiment 21, the terminal 108, 808, 908 according to embodiment 20 is provided, adapted to perform the method according to any one of embodiments 7 to 14.

In an embodiment 22, a terminal 108, 808, 908 to be usable in association with terminating a circuit switched signaling service to the terminal 108, 808, 908 via a circuit switched access of a mobile network 100, 600 is provided, the signaling service being different from a voice call via the circuit switched access and from a mobile terminating location request service, a call via an internet protocol domain of the mobile network 100, 600 and a packet switched access of the mobile network 100, 600 being established for the terminal 108, 808, 908, the terminal 108, 808, 908 being adapted to: receive a paging request for paging the terminal 108, 808, 908 via the packet switched access, the paging request being for the circuit switched signaling service, determine whether a signaling service via the internet protocol domain is available for the terminal 108, 808, 908 depending on the received paging request, the signaling service via the internet protocol domain corresponding to the circuit switched signaling service, and send, via the packet switched access, a support indication indicating a terminal support of the signaling service via the internet protocol domain depending on the signaling service via the internet protocol domain being available for the terminal 108, 808, 908.

In an embodiment 23, the terminal 108, 808, 908 according to embodiment 22 is provided, adapted to perform a method according to any one embodiments 7, 8, 9, 10, 11, 12, 14, 16 and 17.

In an embodiment 24, a communication system for terminating a circuit switched signaling service to the terminal 108, 808, 908 via a circuit switched access of a mobile network 100, 600 is provided, the communication system comprising at least one of a control node according to embodiment 18 or 19 and a terminal according to any one of embodiments 20 to 23.

In an embodiment 25, a computer program, which being executed by processor, is adapted to perform a method according to any one of embodiments of 1 to 17.

It is noted that steps of one of the above described method embodiments also apply to the respective other methods embodiments, the control nodes, the terminal, the communication system, and the computer programs.

Modifications and other embodiments of the disclosed embodiments will come to mind to one skilled in the art having the benefit of the teachings presented in the foregoing descriptions and the associated drawings. Therefore, it is to be understood that the embodiments are not to be limited to the specific embodiments disclosed and that modifications and other embodiments are intended to be included within the scope of this disclosure. Although specific terms may be employed herein, they are used in a generic and descriptive sense only and not for purposes of limitation. The description of the embodiments with reference to 3GPP may not exclude the described embodiments being applicable in other communication networks and/or technologies, the networks and/or technologies being different from 3GPP.

The invention claimed is:

1. A method to be used in association with terminating a circuit switched signaling service to a terminal via a circuit switched access of a mobile network, the signaling service being different from a voice call via the circuit switched access and from a mobile terminating location request service, wherein a call via an internet protocol domain of the mobile network and a packet switched access of the mobile network is or is being established for the terminal, the method comprising:
the terminal receiving a paging request for paging the terminal via the packet switched access, the paging request being for the circuit switched signaling service;
the terminal determining whether a packet switched signaling service that corresponds to the circuit switched signaling service is available via the internet protocol domain for the terminal; and
the terminal sending, via the packet switched access, a support indication indicating a support for the packet switched signaling service via the internet protocol domain depending on the packet switched signaling service via the internet protocol domain being available for the terminal.

2. The method of claim 1, further comprising:
in response to the paging request, the terminal sending, via the packet switched access, not only the support indication, but also a paging rejection for rejecting the paging request depending on the received paging request.

3. The method of claim 1, further comprising the terminal sending, via the packet switched access, a paging rejection for rejecting the paging request depending on a result of the step of determining.

4. The method of claim 1, further comprising
the terminal determining whether a call via the internet protocol domain and the packet switched access is or is being established for the terminal depending on the received paging request; and
the terminal sending a paging rejection depending on the call via the internet protocol domain and the packet switched access is or is being established for the terminal.

5. The method of claim 1, further comprising the terminal receiving, during an attach procedure or a combined tracking area/location area (TA/LA) update procedure, a termination indication transmitted by a mobility management node, wherein the termination indication indicates that a CS short messaging service (SMS) is terminatable to the terminal via the packet switched access.

6. The method according to claim 5, wherein the termination indication is an SMS-only indication.

7. A terminal to be usable in association with terminating a circuit switched signaling service to the terminal via a circuit switched access of a mobile network, the signaling service being different from a voice call via the circuit switched access and from a mobile terminating location request service, wherein a call via an internet protocol domain of the mobile network and a packet switched access of the mobile network is or is being established for the terminal, the terminal being adapted to:
receive a paging request for paging the terminal via the packet switched access, the paging request being for the circuit switched signaling service,
determine whether a packet switched signaling service that corresponds to the circuit switched signaling service is available via the internet protocol domain for the terminal, and
send, via the packet switched access, a support indication indicating a support for the packet switched signaling service via the internet protocol domain depending on the packet switched signaling service via the internet protocol domain being available for the terminal.

8. The terminal of claim 7, wherein the terminal is further adapted to send, via the packet switched access, a paging rejection for rejecting the paging request depending on the received paging request.

9. The terminal of claim 7, wherein the terminal is further adapted to send, via the packet switched access, a paging rejection for rejecting the paging request depending on a result of the step of determining.

10. The terminal of claim 7, wherein the terminal is further adapted to:
determine whether a call via the internet protocol domain and the packet switched access is or is being established for the terminal depending on the received paging request; and
send a paging rejection depending on the call via the internet protocol domain and the packet switched access is or is being established for the terminal.

11. A computer program product comprising a non-transitory computer readable medium, wherein the non-transitory computer readable medium stores:
instructions for processing a received paging request for paging the terminal via the packet switched access, the paging request being for the circuit switched signaling service;
instructions for determining whether a packet switched signaling service that corresponds to the circuit switched signaling service is available via the internet protocol domain for the terminal; and
instructions for sending, via the packet switched access, a support indication indicating a support for the packet switched signaling service via the internet protocol domain depending on the packet switched signaling service via the internet protocol domain being available for the terminal.

12. The computer program product of claim 11, wherein the non-transitory computer readable medium further stores:
instructions for sending, via the packet switched access, a paging rejection for rejecting the paging request depending on the received paging request.

13. The computer program product of claim 11, wherein the non-transitory computer readable medium further stores instructions for sending, via the packet switched access, a paging rejection for rejecting the paging request depending on a result of the step of determining.

14. The computer program product of claim 11, wherein the non-transitory computer readable medium further stores:
instructions for determining whether a call via the internet protocol domain and the packet switched access is or is being established for the terminal depending on the received paging request; and
instructions for sending a paging rejection depending on the call via the internet protocol domain and the packet switched access is or is being established for the terminal.

* * * * *